(12) United States Patent
Pape et al.

(10) Patent No.: US 8,447,664 B1
(45) Date of Patent: *May 21, 2013

(54) METHOD AND SYSTEM FOR MANAGING INVENTORY BY EXPECTED PROFITABILITY

(75) Inventors: Craig J. Pape, Lynnwood, WA (US); Denise M. Stecconi, Seattle, WA (US); Suresh Kumar, Issaquah, WA (US); Joseph K. Hall, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1946 days.

This patent is subject to a terminal disclaimer.

(21) Appl. No.: 11/077,432

(22) Filed: Mar. 10, 2005

(51) Int. Cl.
*G06Q 40/00* (2006.01)

(52) U.S. Cl.
USPC .......................................................... 705/28

(58) Field of Classification Search
None
See application file for complete search history.

(56) References Cited

U.S. PATENT DOCUMENTS

| | | | |
|---|---|---|---|
| 4,314,097 A * | 2/1982 | Campbell, Jr. | 713/170 |
| 5,237,496 A | 8/1993 | Kagami et al. | |
| 5,570,291 A | 10/1996 | Dudle et al. | |
| 5,608,621 A * | 3/1997 | Caveney et al. | 705/10 |
| 5,615,109 A | 3/1997 | Eder | |
| 5,666,514 A * | 9/1997 | Cheriton | 711/144 |
| 5,870,733 A * | 2/1999 | Bass et al. | 707/2 |
| 5,893,123 A * | 4/1999 | Tuinenga | 715/209 |
| 5,953,707 A | 9/1999 | Huang et al. | |
| 5,960,414 A * | 9/1999 | Rand et al. | 705/28 |
| 6,032,125 A | 2/2000 | Ando | |
| 6,044,356 A * | 3/2000 | Murthy et al. | 705/8 |
| 6,049,742 A | 4/2000 | Milne et al. | |
| 6,134,535 A * | 10/2000 | Belzberg | 705/36 R |
| 6,151,582 A | 11/2000 | Huang et al. | |
| 6,154,728 A | 11/2000 | Sattar et al. | |
| 6,289,455 B1 * | 9/2001 | Kocher et al. | 713/194 |
| 6,298,333 B1 | 10/2001 | Manzi et al. | |
| 6,366,890 B1 | 4/2002 | Usrey | |
| 6,397,226 B1 * | 5/2002 | Sage | 707/104.1 |
| 6,609,101 B1 | 8/2003 | Landvater | |
| 6,631,413 B1 * | 10/2003 | Aggarwal et al. | 709/226 |
| 6,671,673 B1 * | 12/2003 | Baseman et al. | 705/7 |
| 6,754,637 B1 * | 6/2004 | Stenz | 705/26 |

(Continued)

OTHER PUBLICATIONS

The Journal of Accountancy, Bringing the Factory to the Classroom, Jan. 1997.*

(Continued)

*Primary Examiner* — Bruce I Ebersman
(74) *Attorney, Agent, or Firm* — Robert C. Kowert; Meyertons, Hood, Kivlin, Kowert & Goetzel, P.C.

(57) ABSTRACT

A method and system for managing inventory by expected profitability. In one embodiment, a method may include individually evaluating a respective expected profitability for each of a number of inventory items, and individually determining a disposition of each of the number of items dependent upon its respective expected profitability. In one particular implementation of the method, individually evaluating the respective expected profitability of a given item may include forecasting an estimated date of transaction corresponding to the given item, forecasting an estimated revenue corresponding to the given item as of the estimated date of transaction, estimating accrued costs of holding the given item until the estimated date of transaction, and comparing a total cost of the given item against the estimated revenue, where the total cost may include the accrued costs of holding the given item until the estimated date of transaction.

22 Claims, 9 Drawing Sheets

U.S. PATENT DOCUMENTS

| | | | |
|---|---|---|---|
| 6,757,689 | B2 | 6/2004 | Battas et al. |
| 6,826,538 | B1* | 11/2004 | Kalyan et al. ..................... 705/7 |
| 6,836,773 | B2 | 12/2004 | Tamayo et al. |
| 6,845,909 | B2* | 1/2005 | Knowles et al. ............. 235/385 |
| 6,847,934 | B1 | 1/2005 | Lin et al. |
| 6,868,397 | B1* | 3/2005 | McCaslin ....................... 705/28 |
| 6,910,017 | B1* | 6/2005 | Woo et al. ...................... 705/10 |
| 6,931,347 | B2* | 8/2005 | Boedi et al. .................... 702/137 |
| 6,963,847 | B1* | 11/2005 | Kennedy et al. .................. 705/8 |
| 6,996,538 | B2* | 2/2006 | Lucas ............................. 705/28 |
| 7,069,234 | B1* | 6/2006 | Cornelius et al. .............. 705/26 |
| 7,092,929 | B1 | 8/2006 | Dvorak et al. |
| 7,124,941 | B1* | 10/2006 | O'Connell ................... 235/385 |
| 7,133,848 | B2* | 11/2006 | Phillips et al. ................ 705/400 |
| 7,146,327 | B1* | 12/2006 | Howard et al. ................. 705/14 |
| 7,212,976 | B2 | 5/2007 | Scheer |
| 7,228,287 | B1 | 6/2007 | Samson et al. |
| 7,231,354 | B1* | 6/2007 | Rooks et al. ...................... 705/1 |
| 7,236,949 | B2 | 6/2007 | Natan et al. |
| 7,251,611 | B2* | 7/2007 | Abbott et al. ..................... 705/7 |
| 7,433,834 | B2* | 10/2008 | Joao ............................... 705/26 |
| 7,542,883 | B2* | 6/2009 | Kumazawa et al. ............. 703/2 |
| 7,543,743 | B1 | 6/2009 | Yu et al. |
| 7,607,577 | B1 | 10/2009 | Yu et al. |
| 7,881,986 | B1 | 2/2011 | Pape et al. |
| 7,912,754 | B2 | 3/2011 | Tirinato et al. |
| 2002/0069079 | A1 | 6/2002 | Vega |
| 2002/0072999 | A1 | 6/2002 | Andres et al. |
| 2002/0099631 | A1 | 7/2002 | Vanker et al. |
| 2002/0116348 | A1 | 8/2002 | Phillips et al. |
| 2002/0128938 | A1 | 9/2002 | Schofield et al. |
| 2002/0138431 | A1* | 9/2002 | Antonin et al. ................. 705/42 |
| 2002/0143598 | A1 | 10/2002 | Scheer |
| 2002/0143669 | A1 | 10/2002 | Scheer |
| 2002/0147630 | A1 | 10/2002 | Rose et al. |
| 2002/0147666 | A1 | 10/2002 | Baseman et al. |
| 2002/0147767 | A1 | 10/2002 | Brice et al. |
| 2002/0156684 | A1* | 10/2002 | Stone et al. ..................... 705/22 |
| 2002/0156884 | A1* | 10/2002 | Bertram et al. ............. 709/224 |
| 2002/0178071 | A1 | 11/2002 | Walker et al. |
| 2003/0004750 | A1* | 1/2003 | Teraoka et al. ................... 705/1 |
| 2003/0009416 | A1* | 1/2003 | Mara ............................... 705/37 |
| 2003/0028457 | A1 | 2/2003 | Costa et al. |
| 2003/0046156 | A1 | 3/2003 | Cromer et al. |
| 2003/0083936 | A1* | 5/2003 | Mueller et al. .................. 705/14 |
| 2003/0130966 | A1* | 7/2003 | Thompson et al. ........... 705/500 |
| 2003/0233246 | A1* | 12/2003 | Snapp et al. ..................... 705/1 |
| 2004/0006504 | A1* | 1/2004 | Mariamova et al. ............ 705/10 |
| 2004/0059627 | A1* | 3/2004 | Baseman et al. ................ 705/10 |
| 2004/0064397 | A1* | 4/2004 | Lynn et al. ...................... 705/37 |
| 2004/0068459 | A1 | 4/2004 | Goulet et al. |
| 2004/0078287 | A1 | 4/2004 | Yang |
| 2004/0088223 | A1* | 5/2004 | Bryson et al. ................... 705/26 |
| 2004/0128212 | A1 | 7/2004 | Zieger et al. |
| 2004/0199397 | A1 | 10/2004 | Dresden |
| 2004/0215544 | A1* | 10/2004 | Formale et al. ................. 705/36 |
| 2004/0249711 | A1 | 12/2004 | Walker et al. |
| 2004/0260626 | A1 | 12/2004 | Christie et al. |
| 2005/0055286 | A1 | 3/2005 | Zimet |
| 2005/0131779 | A1 | 6/2005 | Kitamura et al. |
| 2005/0154630 | A1 | 7/2005 | Lin et al. |
| 2005/0177387 | A1* | 8/2005 | Mojsa ............................... 705/1 |
| 2005/0246269 | A1* | 11/2005 | Smith ............................. 705/39 |
| 2006/0111989 | A1 | 5/2006 | Church et al. |
| 2006/0122881 | A1* | 6/2006 | Walker et al. ................... 705/14 |
| 2006/0149577 | A1* | 7/2006 | Stashluk et al. .................. 705/1 |
| 2006/0161504 | A1 | 7/2006 | Walser et al. |
| 2007/0136126 | A1 | 6/2007 | Notani et al. |
| 2007/0174122 | A1* | 7/2007 | Howard et al. ................. 705/14 |
| 2007/0239569 | A1* | 10/2007 | Lucas et al. ..................... 705/28 |
| 2008/0177593 | A1 | 7/2008 | Clayton |
| 2008/0301009 | A1 | 12/2008 | Plaster et al. |
| 2009/0030761 | A1 | 1/2009 | Amaresh et al. |

OTHER PUBLICATIONS

Wholesaling Used Automobiles, Robert Athan Lynn 1958 Thesis, attached.*
Liquidating Non-Moving Inventory, John Schreibfeder, Effective Inventory Management, 1998, 4 pages.*
U.S. Appl. No. 11/076,844, filed Mar. 10, 2005.
U.S. Appl. No. 11/299,860, filed Dec. 12, 2005.
U.S. Appl. No. 11/299,870, filed Dec. 12, 2005.
SellerEngine FAQ, Feb. 2005, downloaded from http://web.archive.org/web20050220024916/www.sellerengine.com/faq.htm, pp. 1-5.
SellerEngine general overview, Feb. 2005, downloaded from http://web.archive.org/web/20050222005850/http://www.sellerengine.com/SellerEngine.htm, pp. 1-3.
SellerEngine product overview, Feb. 2005, downloaded from http://web.archive.org/web/20050121013225/www.sellersengine.com/trialguide.htm, pp. 1-2.
Fillz FAQ, Feb. 2005, downloaded from http://web.archive.org/web/20050212084321/http://www.fillz.com/faq/cc_inventory, pp. 1-3.
Vendio Overview, Feb. 2005, downloaded from http://web.archive.or/web/20050208103009/http://www.vendio.com/my/smpp/feature_matrix.html, pp. 1-3.
ScoutPal Overview, Feb. 2005, downloaded from http://web.archive.org/web/20050210151425/http://www.scoutpal.com/, 1 page.
Nahmias, Steven (1979), "Simple Approximations for a Variety of Dynamic Leadtime Lost-Sales Inventory Models," Operations Research, vol. 27 (5), 904-924.
Schneider, Helmut (1981), "Effect of Service-Levels on Order-Points or Order-Levels in Inventory Models," International Journal on Production Research, vol. 19 (6), 615-631.
U.S. Appl. No. 12/428,982, filed Apr. 23, 2009.
Bringing the Factory to the Classroom, Cathleen Burns, Jan. 1, 1997, 5 pages.
The Correlative Relationship between value, price and Cost, Journal of American Academy of Business, Cambridge, MA Sep. 2002, 9 pages.
Why are returns to tough, Bob Trebilcock, Oct. 2001, Modern Materials v. 56, n11, p. 45.
U.S. Appl. No. 13/076.215, filed Mar. 30, 2011, Schoenharl, et al.
U.S. Appl. No. 13/004,621, filed Jan. 11, 2011, Pape, et al.

* cited by examiner

METHOD AND SYSTEM FOR MANAGING INVENTORY BY EXPECTED PROFITABILITY

BACKGROUND OF THE INVENTION

1. Field of the Invention

This invention relates to inventory management and, more particularly, to analysis of inventory metrics or measurement of inventory health.

2. Description of the Related Art

In order to offer customers a variety of items readily available for delivery, many merchants (whether engaging in electronic or conventional "brick and mortar" commerce) hold various quantities of such items within inventory facilities. Keeping items in inventory may serve to buffer variations in customer demand or a manufacturer or distributor's ability to supply various items. For example, different items offered for sale by a merchant may have different manufacturer lead times. Holding quantities of such items as inventory may enable a merchant to offer consistent availability of these items to customers despite the different lead times.

Many merchants employ conventional inventory management schemes that attempt simply to ensure that the inventory on hand is sufficient to cover expected customer order volumes for a particular period of time. That is, such conventional inventory management schemes focus on whether there is enough inventory on hand to meet projected demand. However, storing inventory is not without cost. For example, providing a physical facility in which to store inventory presents recurring infrastructure costs directly attributable to the inventory items stored in the facility. Further, while items are in storage awaiting sale, debt or capital costs associated with acquiring the items may accumulate. When inventory holding costs are considered, having too much inventory may also be a concern, as accumulating costs may erode profitability.

However, taking holding costs into account when optimizing inventory presents challenges. Different items may incur different types of costs and present different sales dynamics. In principle, intervention may be undertaken to mitigate the costs of underperforming items, for example by reducing the number of such items on hand. However, aggregating costs across such different items may obscure inventory management intervention opportunities at the item level. Further, multiple disposition options may exist with respect to a given item, not all of which may equally satisfy desired constraints on intervention outcome.

SUMMARY

Various embodiments of a method and system for managing inventory by expected profitability are disclosed. According to one embodiment, a method may include individually evaluating a respective expected profitability for each of a number of inventory items, and individually determining a disposition of each of the number of items dependent upon its respective expected profitability.

In one particular implementation of the method, individually evaluating the respective expected profitability of a given item may include forecasting an estimated date of transaction corresponding to the given item, forecasting an estimated revenue corresponding to the given item as of the estimated date of transaction, estimating accrued costs of holding the given item until the estimated date of transaction, and comparing a total cost of the given item against the estimated revenue, where the total cost may include the accrued costs of holding the given item until the estimated date of transaction.

An inventory management system is further contemplated, which according to one embodiment may include a number of data sources configured to store inventory metrics associated with a number of inventory items, a forecast service configured to predict future transaction behavior of the number of items, and an inventory manager. The inventory manager may be configured to retrieve a respective estimated date of transaction corresponding to each of the number of items from the forecast service, retrieve a respective estimated revenue corresponding to each of the number of items as of the respective estimated date of transaction from the forecast service, and individually estimate accrued costs of holding each of the number of items until its respective estimated date of transaction. The inventory manager may be further configured to individually generate a respective expected profitability for each of the number of items dependent upon its respective date of transaction and its respective estimated revenue, and categorize each of the number of items according to its respective expected profitability.

Figure 1:
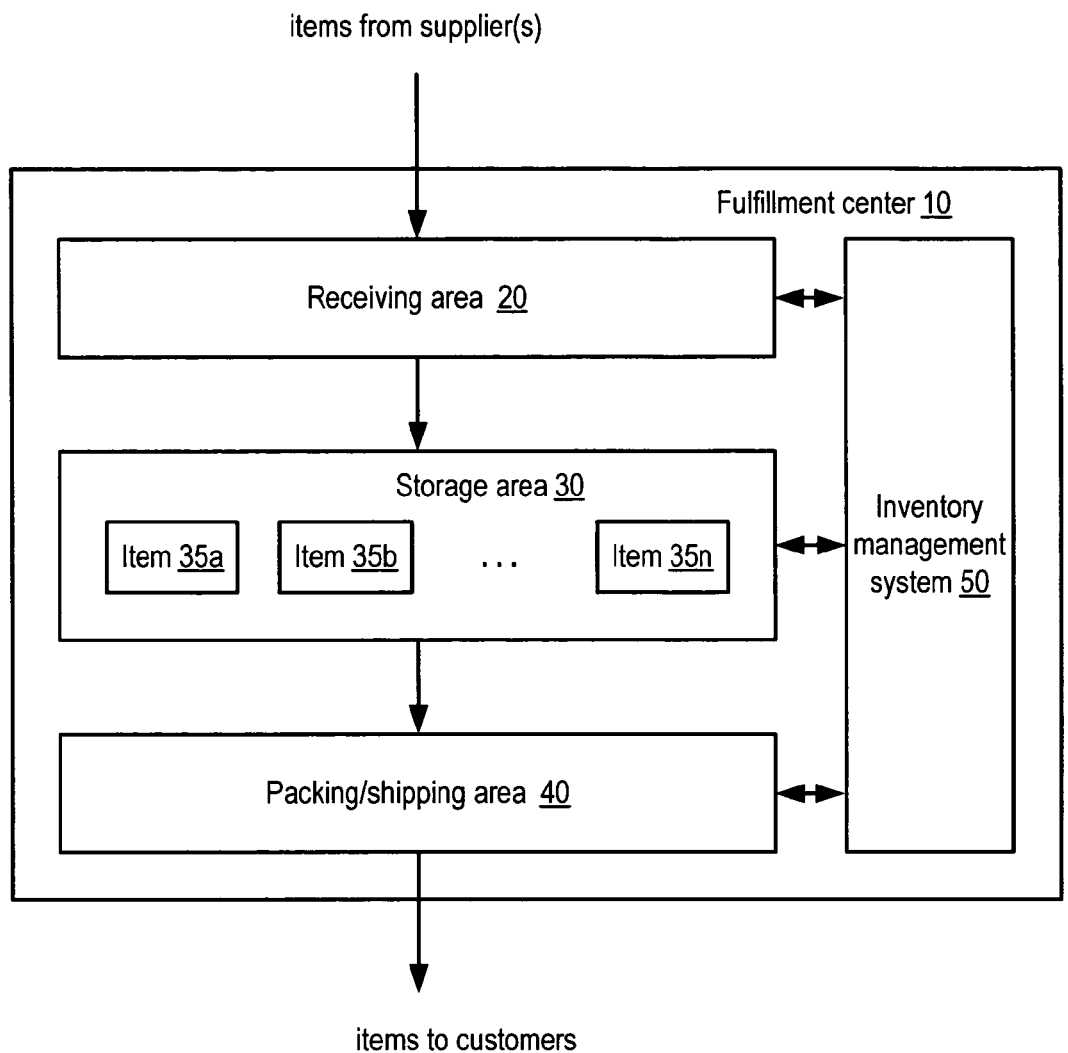
FIG. 1 is a block diagram illustrating one embodiment of a fulfillment center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Inventory Management Using Inventory Metrics

One embodiment of a fulfillment center configured to store inventory items is illustrated in FIG. 1. In the illustrated embodiment, fulfillment center 10 includes a receiving area 20, a storage area 30 configured to store an arbitrary number of items 35a-n, and a packing/shipping area 40. The arrangement of the various areas within the illustrated embodiment of fulfillment center 10 is depicted functionally rather than schematically. For example, in some embodiments, it is noted that multiple different receiving areas 20, storage areas 30 and packing/shipping areas 40 may be interspersed rather than segregated. Additionally, fulfillment center 10 includes an inventory management system 50 configured to interact with each of receiving area 20, storage area 30 and packing/shipping area 40.

Fulfillment center 10 may be configured to receive different kinds of items 35 from various suppliers and to store them until a customer order specifying particular ones of items 35 is received. The particular items 35 may then be selected from storage and sent to the customer. The general flow of items through fulfillment center 10 is indicated using arrows. Specifically, in the illustrated embodiment, items 35 may be received from one or more suppliers, such as manufacturers, distributors, wholesalers, etc. at receiving area 20. In various embodiments, items 35 may include merchandise, commodities, perishables, or any suitable type of item depending on the nature of the business operating fulfillment center 10. Upon being received from a supplier at receiving area 20, items 35 may be prepared for storage. For example, in some embodiments items 35 may be unpacked or otherwise rearranged, and inventory management system 50 (which, as described below, may include one or more software applications executing on a computer system) may be updated to reflect the type, quantity, condition, cost or any other suitable parameters with respect to newly received items 35.

After arriving through receiving area 20, items 35 may be stored within storage area 30. In some embodiments, like items 35 may be stored together in bins, on shelves or via other suitable storage mechanisms, such that all items 35 of a given kind are stored in one location. In other embodiments, like items 35 may be stored in different locations. For example, to optimize retrieval of certain items 35 having high turnover within a large physical facility, those items 35 may be stored in several different locations to reduce congestion that might occur at a single point of storage.

When a customer order specifying one or more of items 35 is received, the corresponding items 35 may be selected or "picked" from storage area 30. In various embodiments, item picking may range from minimally automated to completely automated. For example, in one embodiment fulfillment center employees may pick items 35 using written pick lists derived from customer orders, while in another embodiment conveyor belts and robotics may be used to pick and transfer items 35. After the items 35 corresponding to a particular order are picked, they may be processed at packing/shipping area 40 for delivery to the customer. For example, items may be packaged for shipment to the customer using a common carrier, or simply bagged or otherwise prepared to be given to a customer at an order pickup counter. In some embodiments, further interaction with inventory management system 50 may occur when items 35 are picked from storage area 30 and/or processed at packing/shipping area 40, for example to update inventory records to reflect the removal of inventory, record revenue for the sale or other transaction (e.g., lease, rental, exchange, etc) and so forth.

Management of items 35 stored as inventory within fulfillment center 10 presents complex optimization problems. For example, if a particular item 35 ordered by a customer is not in stock within fulfillment center 10, the customer may be forced to wait for delivery until that particular item 35 can be obtained, or the customer may cancel the order resulting in a lost sale. Consequently, keeping a number of units of items 35 on hand may assist in the timely fulfillment of orders and increase customer satisfaction.

However, various costs are typically associated with holding items 35 in storage for any period of time. In some embodiments, holding a unit of an item 35 in storage within storage area 30 may incur incremental storage costs. For example, the cost of providing fulfillment center 10 in which items 35 may be stored may include recurring real estate costs (e.g., lease costs, debt service, etc.), personnel costs, facilities costs (e.g., utilities, maintenance, etc.) and any other costs associated with fulfillment center 10. In one embodiment, such costs may be incrementally apportioned to a given unit of an item 35 according to an area or volume of storage space occupied by that unit. For example, storage costs may be applied to each unit of each item 35 at a rate of dollars per square/cubic foot of item volume per unit of storage time (day, week, month, etc.). In other embodiments, different cost allocation methods may be employed. For example, in one embodiment the costs of providing special storage or handling, such as refrigeration, controlled atmosphere, etc. may exclusively be allocated to those items 35 that require such measures, rather than averaging those costs across all items 35. Similarly, in one embodiment, storage may include temporary capacity (e.g., short-term leased space, seasonal overflow capacity, etc.) as well as permanent capacity (e.g., owned space, year-round capacity, etc.), each of which may have different cost characteristics. Correspondingly, in some such embodiments items 35 stored within a particular type of facility may exclusively incur costs of the particular type of facility according to their storage utilization (e.g., area, volume, etc.). Alternatively, storage costs may be allocated to items 35 based upon their value or sales volume as opposed to their size. In some embodiments, additional costs associated with obtaining a given item 35, such as transportation/handling costs charged by a supplier or incurred by eventual shipment to a customer, may be included within storage costs for that given item 35.

In addition to storage costs, in some embodiments, holding a unit of an item 35 in storage may incur capital or economic costs related to the price paid to obtain the item. That is, once working capital or cash flow is committed to a unit of an item 35 (e.g., once that unit is paid for), that economic value is not available for other purposes; the committed value is "tied up" in the corresponding inventory. Depending on the accounting scheme used to manage the costs of inventory, a cost of debt or other time-value-of-money cost (also referred to as an economic cost) may be associated with the price paid for a given unit of an item 35. For example, in one embodiment an effective annual interest rate of 6% may be applied to the price paid for a unit of inventory and may continue to accrue until that unit is sold or otherwise disposed of. In some embodiments, economic costs may be applied to storage costs in addition to the price paid for a unit of inventory. In certain cases, negative economic costs may also be associated with units of items 35. For example, a supplier may offer a rebate for an item 35 that effectively reduces its cost.

Figure 2:
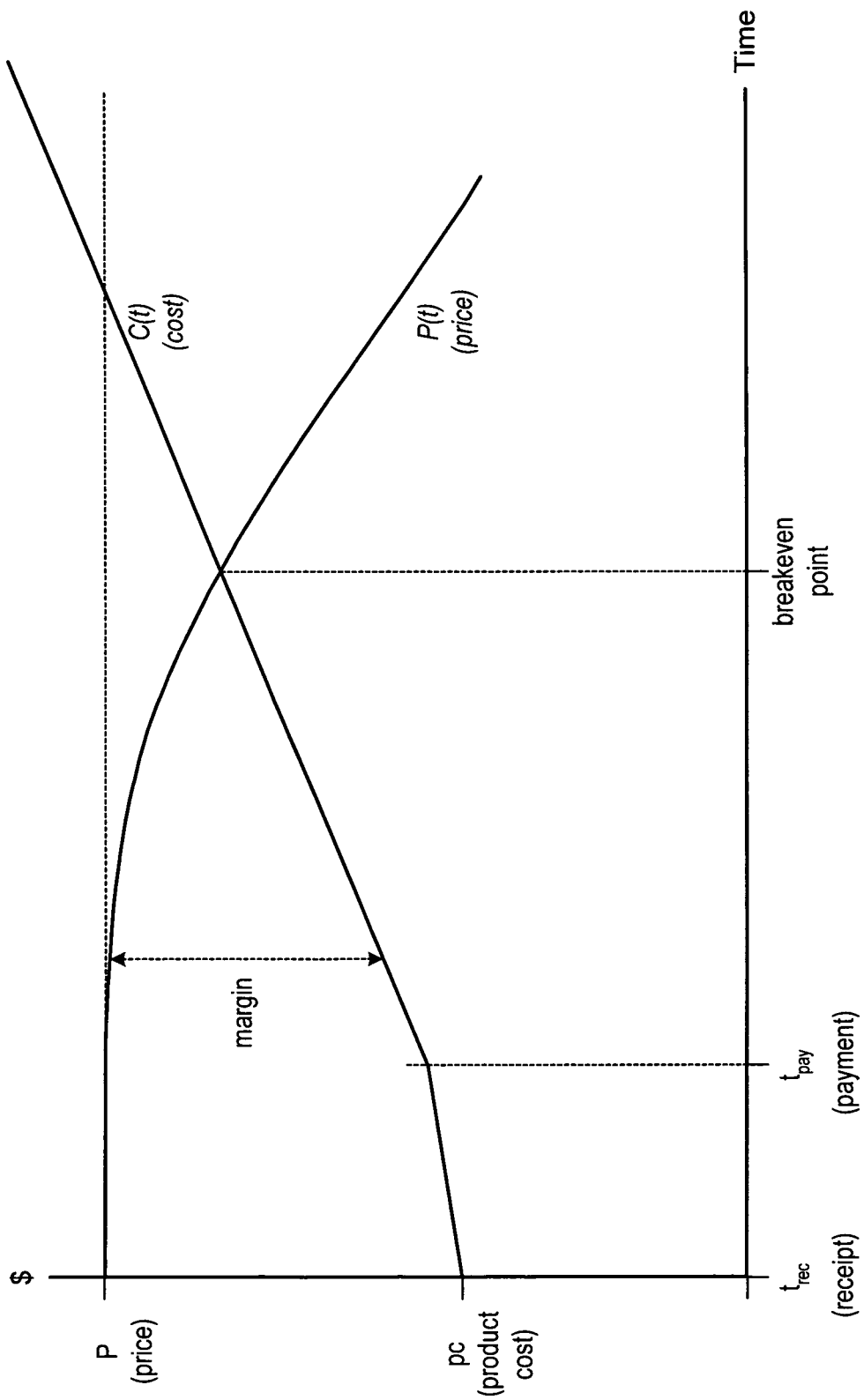
FIG. 2 is a graph illustrating exemplary accumulation of holding costs of a given item over time.

One definition of the profitability or margin of a given item 35 may be given as the difference between the revenue received (e.g., the sale price) for the given item 35 and the cost paid to acquire and hold the given item 35 until the date of the transaction resulting in revenue. As illustrated in FIG. 2, storage and economic costs associated with the given item 35 may increase over time, and the sale price may fluctuate between the time the given item 35 was received into inventory and the time it was sold. In the graph of FIG. 2, the time the given item 35 was received into inventory is given as $t_{rec}$. The cost and current price of the given item 35 as of the time of receipt are given as pc and P, respectively. In some embodiments, as described above, the initial item cost pc for a given item 35 may include the price paid for the given item 35 as well as all costs associated with receiving the given item 35 into inventory, including transportation costs from the supplier to fulfillment center 10, labor costs to receive and stock item 35, etc.

As shown in FIG. 2, the revenue or price associated with the given item 35 may vary as a function of time, illustrated as the curve P(t). In the illustrated embodiment, storage costs for the given item 35 may begin accruing as of $t_{rec}$. However, economic costs may begin accruing at a later time, according to the terms of payment set by the supplier of the given item 35. For example, some suppliers may require payment within 60 or 90 days of delivery. The time at which economic costs begin accruing for the given item 35 (which is generally the time at which payment is actually made) is given as $t_{pay}$. For items 35 that must be paid for upon receipt, $t_{rec}$ may be equal to $t_{pay}$. Total costs of holding the given item 35 over time, including both storage and economic costs, are illustrated as the curve C(t).

According to the definition of profitability given above, the total profit or margin of the given item 35 at a particular time is given as the difference between P(t) and C(t) at that time. It is noted that at the point these two curves intersect, illustrated as the breakeven point, the total margin associated with the given item 35 has been eroded by the holding costs, such that a sale or other transaction involving the given item 35 after this point may result in a net loss when accounting for holding costs. To the extent that the relationships P(t) and C(t) are understood, the likelihood that a particular unit of a given item 35 will have a positive profitability or not may be determined, depending on an expected date of revenue or disposition of the particular unit. It is noted that profitability may be negative. For example, in the region of FIG. 2 beyond the illustrated breakeven point, costs exceed revenues, such that the difference between revenue and costs is less than zero. An item 35 having a positive profitability may also be referred to as being "profitable," and an item 35 having a negative profitability may also be referred to as being "unprofitable."

Often, revenue may be realized when an item 35 is sold. However, it is contemplated that other types of revenue-generating transactions may occur for an item 35 and may be the subject of inventory metrics and profitability analysis as described below. For example, an item 35 may be rented, leased or licensed to a customer under specific terms in exchange for revenue. The term "sale" may be used herein to generically describe any suitable transaction involving an item 35 resulting in either direct or indirect (e.g., imputed or tangential) revenue, and is intended to encompass rentals, leases, subscriptions, and other types of revenue models.

Information relating to inventory cost and pricing, as well as any other information pertinent to inventory such as condition, quantity, acquisition date, purchase terms, etc. may collectively be referred to as inventory metrics. In some embodiments of inventory management system 50, inventory metrics may be generated, collected and evaluated to yield information that may be used to make decisions regarding specific inventory items 35, as described in greater detail below. In particular, as described below, in some embodiments inventory metrics may be manipulated and analyzed with respect to individual inventory items, in contrast to metrics that are averaged over an aggregation of items. In some embodiments, inventory metrics may include metrics indicative of the overall "health" of inventory items 35, either individually or in aggregation. Generally speaking, inventory health may reflect factors such as expected profitability of items, rate of inventory turnover, inventory coverage versus expected demand, or other factors of interest.

Figure 3:
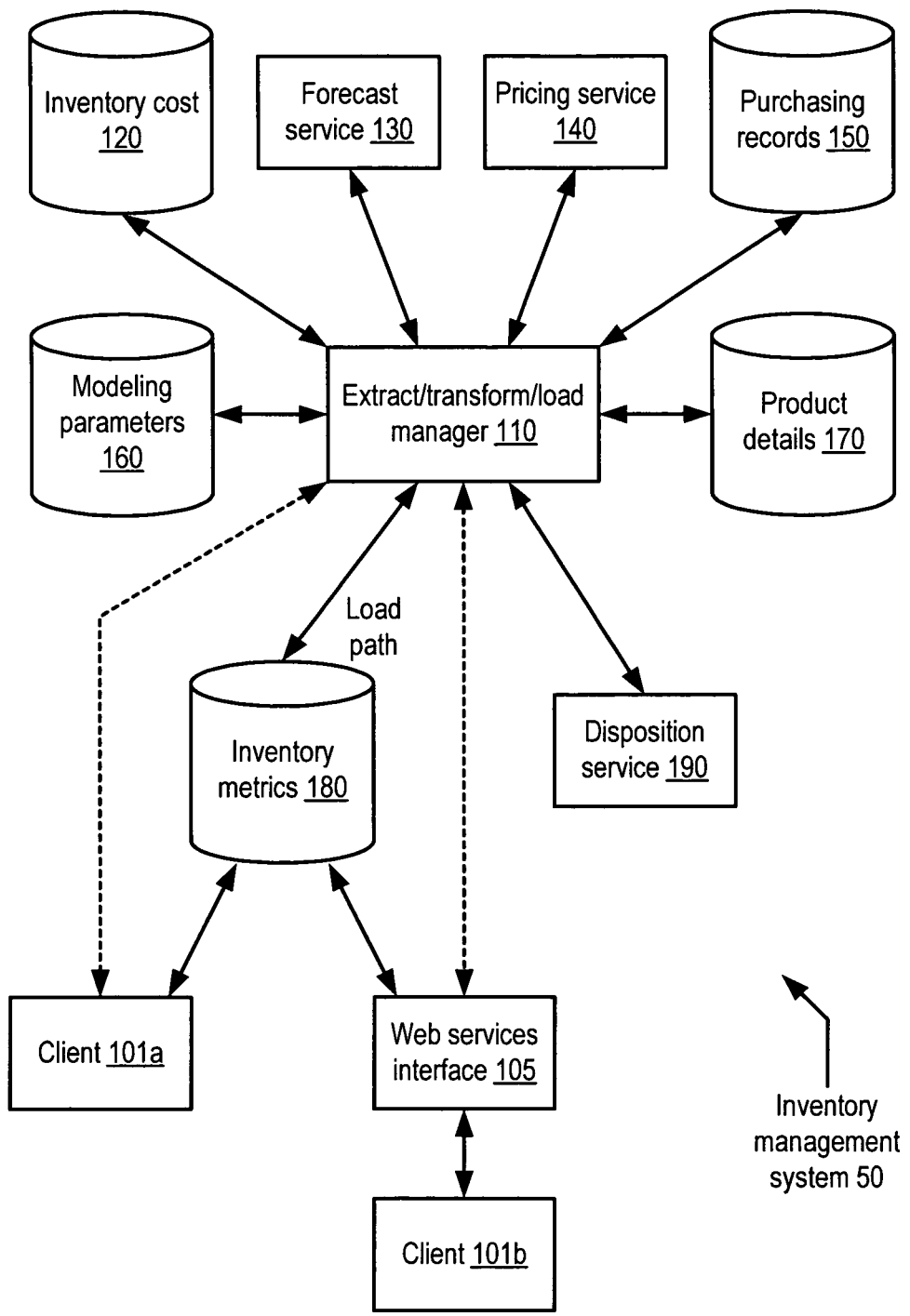
FIG. 3 is a block diagram illustrating one embodiment of an inventory management system.

One exemplary embodiment of inventory management system 50 is illustrated in FIG. 3. In the illustrated embodiment, inventory management system 50 includes an extract/transform/load manager 110 (also referred to as inventory manager 110 or simply manager 110) configured to interact with multiple different services and data sources including an inventory cost (IC) database 120, a forecast service 130, a pricing service 140, a purchasing records database 150, a modeling parameters database 160, and a product details database 170. As described in greater detail below, manager 110 may be configured to interact with the aforementioned services and data sources or other services and/or data sources to produce inventory metrics that may be stored in inventory metrics database 180. Manager 110 may also be configured to interact with a disposition service 190.

In the illustrated embodiment, one client 101a may be configured to interact directly with inventory metrics database 180, for example through a query interface. In some embodiments, client 101a may also interact directly with manager 110, for example to gain access to other data sources or services within system 100. Additionally, client 101b may be configured to interact with inventory metrics database 180 via a web services interface 105. In some embodiments, client 101b may also access manager 110 via web services interface 105 for purposes similar to client 101a. Generally speaking, a web services interface may be configured to provide a standard, cross-platform API for communication between a client requesting some service to be performed and the service provider. In some embodiments, web services interface 105 may be configured to support the exchange of documents including information describing the service request and response to that request. Such documents may be exchanged using standardized web protocols, such as the Hypertext Transfer Protocol (HTTP), for example, and may be formatted in a platform-independent data format, such as eXtensible Markup Language (XML), for example. By employing the web services model, including the use of standard web protocols and platform-independent document formatting, the number of types of interfaces manager 110 needs to support may be reduced, and cross-platform interoperability of clients 101 and manager 110 may be improved.

A data source may generally include any suitable type of repository configured for data storage and access. For example, in some embodiments a data source may include a relational database or a data warehouse having a query language interface. Alternatively, a data source may include a spreadsheet or a text document, including documents formatted in a markup language such as a version of Hypertext Markup Language (HTML) or a version of eXtensible Markup Language (XML), or minimally structured documents such as plain text documents. The terms "data source" and "database" may be used interchangeably herein to broadly refer to any suitable type of data repository.

In general, a service may include an entity, such as a program, process, web service, or another suitable entity, that may be configured to receive one or more input parameters and to responsively provide one or more results. For example, in one embodiment a service may include a process configured to listen for requests to a particular network address or port, to evaluate such requests and to return results to the requestor. It is contemplated that in some embodiments, a data source may be implemented using a service and vice versa. For example, a database may present a query interface to clients as a service.

In one embodiment, manager 110 may be configured to retrieve inventory metrics and other information from a variety of sources and services, such as those illustrated in FIG. 3, and to apply transformations to the retrieved information to derive new inventory metrics configured to assess the current and predicted future state of various items 35. One such method of data transformation is described below in conjunction with the description of FIG. 4. Different embodiments of the data sources and services that may function as inputs to such data transformation may include the following features.

Inventory cost database 120 may be configured to store various types of information pertaining to items 35 actually stored in inventory within one or more fulfillment centers 10 at a given time. For example, in one embodiment inventory cost database 120 may be configured as a relational or non-relational database storing a number of inventory records each including a number of fields. In one embodiment, a given inventory record may include some combination of a number of fields, including a unique identifier specific to the kind of item 35 corresponding to the record (e.g., a Stock Keeping Unit (SKU) code, an International Standard Book Number (ISBN), a Universal Product Code (UPC), a proprietary item-specific code, another type of code or a combination of such identifiers). The given inventory record may also include an indication of the quantity of the corresponding item 35, such as a number of individual units of an item 35, to which the record corresponds. The given inventory record may further include such fields as a cost paid for the corresponding unit(s) of item 35 (e.g., a per-unit cost or an aggregate cost), a location of the units (e.g., identifying a particular fulfillment center 10 and/or a particular location within a fulfillment center 10), a date of acquisition or receipt of the units (e.g., $t_{rec}$), and/or a condition grade of the units (e.g., a numerical grade indicating whether the units are in new condition or in various state of damage). In some embodiments, the given inventory record may include other fields, such as a field indicating the general product or accounting group to which units of item 35 belong.

It is noted that records may be stored with different degrees of aggregation in different embodiments of inventory cost database 120, depending in part on the fields defined for records within the database. For example, in one embodiment, each record may include a field for a unique, per-unit identifier such as a serial number, and each unit of a given item 35 may correspond to a single respective record according to its unique unit identifier. In another embodiment, units of a given item 35 may be aggregated within a single record to the extent those units share common values for the fields of that record. For example, units of a given item 35 acquired on the same date for the same price and in the same condition may be indicated by a single record including these fields as well as the total quantity of the corresponding units.

In some embodiments, inventory cost database 120 may be accessed and updated each time a unit of an item 35 is stored into inventory or is sold or otherwise disposed of. In such embodiments, inventory cost database 120 may reflect a real-time or near-real-time state of items stored within fulfillment center 10. In other embodiments, specific inventory transactions involving items 35 may be batched and processed in groups at intervals, such as hourly or daily. It is contemplated that in some embodiments, a single instance of inventory cost database 120 may store inventory information for items 35 stored in multiple different fulfillment centers 10, while in other embodiments each fulfillment center 10 may utilize a respective inventory cost database 120.

Forecast service 130 and pricing service 140, in some embodiments, may respectively be configured to provide forecasted transaction and revenue (e.g., pricing) information for a given item 35. For example, in one embodiment, forecast service 130 may be configured to predict sales volume on a daily, weekly, monthly or other time basis for a given item 35. Similarly, in one embodiment, pricing service 140 may be configured to predict the future price of the given item 35 at different points in time (e.g., to predict the shape of the curve P(t)).

In one embodiment, each of forecast service 130 and pricing service 140 may implement a model configured to draw from a variety of inputs in order to make a prediction. For example, the model implemented by forecast service 130 may be configured to consult historical sales or other transaction data for a given item 35 to make a first-order assumption regarding future transaction behavior for given item 35, such as to identify seasonal or other trends in demand. Similarly, pricing service 140 may model future pricing as a function of historical pricing. However, far more sophisticated models of sales and pricing are possible and contemplated. For example, in some embodiments sales modeling for a given item 35 may take into account historical behavior of similar items 35, future product development plans, empirical customer shopping data (e.g., as evidenced by tracking and collecting data on customer navigation of an e-commerce website), customer demographics and trends, planned marketing or promotional efforts, or other factors. Likewise, in some embodiments price modeling for the given item 35 may take into account historical price behavior of similar items 35, competitive trends, supply vs. demand trends or other pricing factors. Additionally, in some embodiments a forecast of transaction behavior provided by forecast service 130 may take into account expectations of future pricing, such as may be provided by pricing service 140, and vice versa. For example, a planned future price promotion for an item 35 (such as a sale or rebate, for example) may be expected to increase its demand. Conversely, changes in future demand for an item 35 (e.g., due to seasonality, supply constraints or surpluses, etc.) may correspondingly affect its pricing.

It is contemplated that in some embodiments, any measurable business or economic variable having a correlation with sales or pricing may be taken into consideration by forecast service 130 or pricing service 140. For example, data mining or sensitivity analysis techniques may be performed on historical data to discern the correlation of various variables with item sales or price behavior. In some embodiments, different models may be used for different types of items 35. For example, sales and pricing behavior may be modeled for classes of items 35, such as books, DVDs, appliances, etc., or for each individual item 35. It is also contemplated that in some embodiments, price and sales modeling may be interdependent. For example, in one embodiment, each of forecast service 130 and pricing service 140 may consult the other in the course of making a prediction, and in some instances sales and price modeling may be performed iteratively. In some embodiments, forecast service 130 and pricing service 140 may be implemented as a single entity, for example as one service including several separate models or one complex model. It is also noted that in some embodiments, revenue may not actually be received as of an estimated or actual transaction date, depending on accounting practices, payment terms, etc. For example, in some instances a purchase transaction may be made on credit terms. In some such embodiments, an estimated or expected transaction date may include a date at which revenue becomes liable, regardless of whether tangible value has been exchanged. In other embodiments, a transaction date may reflect actual settlement of revenue, which may occur after liability for revenue begins.

Purchasing records database 150 may be configured to store records pertaining to the ordering and acquisition of various items 35 from corresponding suppliers. For example, in one embodiment purchasing records database 150 may include the details of specific purchase orders placed for specific items 35, which may include details such as the purchase order date, an indication of the item(s) 35 and corresponding quantities ordered, identification of who originated and/or approved the purchase order, etc. Additionally, in some embodiments purchasing records database 150 may include information provided by various suppliers, such as purchase order acknowledgement, approval or other order status information, expected order shipping date, transportation/handling charges, order payment terms (e.g., net on receipt or within a period of time after receipt), or other relevant information. Like inventory cost database 120 described above, in some embodiments purchasing records database 150 may be updated in real time or near-real time as orders for inventory are placed, acknowledged and processed, while in other embodiments purchasing records database 150 may be updated in batches at intervals of time.

Analyses to determine expected holding costs, profit margins and other salient inventory metrics associated with items 35 may depend on one or more parameters. For example, as described above in conjunction with the description of FIG. 2, in some embodiments the holding cost of a given item 35 may depend on a storage cost and an economic cost associated with holding the given item 35. In one embodiment, storage cost may be parameterized in terms of cost per unit of item area, volume or other attribute, per unit of storage time, such as a fixed cost per square foot of item area per day, for example. Similarly, economic cost may be parameterized as a cost of capital or cost of debt, such as an annual interest rate of 6%, applied daily, for example. It is contemplated that other parameters may apply to calculations of inventory metric, and that these parameters need not be constants. For example, as described above, in one embodiment different storage cost parameters may apply to different items 35 depending on the type of storage required. Similarly, different economic cost parameters may be associated with different items 35 depending on the value or liquidity of the items 35. In some embodiments, parameters used in modeling inventory metrics may themselves be simple or complex functions. For example, in one embodiment a storage cost parameter may include a function that takes into account declining real-estate debt for a fulfillment center 10 over time, correspondingly reducing that component of storage costs as debt is retired. In the illustrated embodiment, these and other modeling parameters are collectively shown as modeling parameters 160, although it is contemplated that in some embodiments, such parameters may be built into manager 110 or incorporated within other data sources.

In some embodiments, manager 110 may be configured to generate reports of various inventory metrics, including metrics reflecting the current and projected future state of various inventory items 35. For example, one possible type of report may order groups of items 35 according to their accumulated holding costs as of a given date. In some instances, it may be useful to report or format inventory metrics on the basis of information specific to items 35 that may not be stored elsewhere. For example, in one embodiment, reporting of metrics for items 35 may be segregated according to the general class or type to which an item 35 belongs (e.g., books, music, electronics, clothing, etc.), by more specific categories or subcategories within a class or type of item (e.g., handheld audio devices, MP3 players), by manufacturer or brand name, or by a combination of these or other item attributes. Many of these attributes may be useful for organizing and reporting information about items 35, but not necessary for tracking and managing the dynamic inventory status of items 35. Thus, in some embodiments, various details regarding attributes of items 35 may be stored separately from inventory status information. For example, in the illustrated embodiment, inventory cost database 120 may be configured to utilize a unique item identifier to differentiate inventory records corresponding to various items 35, while product details database 170 may be configured to store additional details or attributes such as product category, manufacturer information, item specifications, etc. that are associated with particular items 35. In one embodiment, both inventory cost database 120 and product details database 170 may include records indexed by a common field, such as a unique item identifier field, such that manager 110 may cross-reference both data sources.

In some embodiments, inventory metrics database 180 may be configured to store inventory metrics derived from other data sources by manager 110. For example, in one embodiment inventory metrics database 180 may be configured to store data regarding the expected profitability of various items 35 as determined by analysis of metrics from a variety of data sources and services, as described below in conjunction with the description of FIG. 4. In some such embodiments, inventory metrics database 180 may be configured to store only derivative metrics (that is, information not already stored elsewhere). However, in other embodiments, inventory metrics database 180 may also be configured to warehouse or consolidate data that is also stored in other places within inventory management system 50. For example, in one embodiment manager 110 may be configured to extract records or portions of records stored in inventory cost database 120, purchasing records database 150 or elsewhere within system 50, to transform extracted data (e.g., by reformatting or analysis) and to store such records or record portions within inventory metrics database 180 in addition to other metrics derived from the extracted data. Such a model of interaction among various data sources, manager 110 and inventory metrics database 180 may be referred to as an extract-transform-load model. In the embodiment of FIG. 3, the load path from manager 110 to database 180 is explicitly shown, it being understood that manager 110 may perform extraction from any of the other data sources shown. In some instances, warehousing certain records originating from different data sources within one data source may improve the performance of querying or processing the warehoused records. For example, such warehousing may reduce the number of queries needed to access the warehoused records. Additionally, in embodiments where different data sources are geographically distributed or subject to congestion, warehousing records may reduce the latency (e.g., network latency) associated with repeatedly accessing a distant or congested data source.

It is noted that the illustrated architecture of inventory management system 50 is intended only as an example, and that in alternative embodiments, the various different types of data sources and services implemented within inventory management system 50 may be partitioned in different ways. For example, different data sources such as inventory cost database 120 and purchasing records database 150 may be implemented as a single data source, or their contents may be distributed across a different number of data sources. In some embodiments, certain data items may be replicated across multiple different data sources. Also, in some embodiments, manager 110 may be implemented as multiple different modules, processes or threads.

Figure 4:
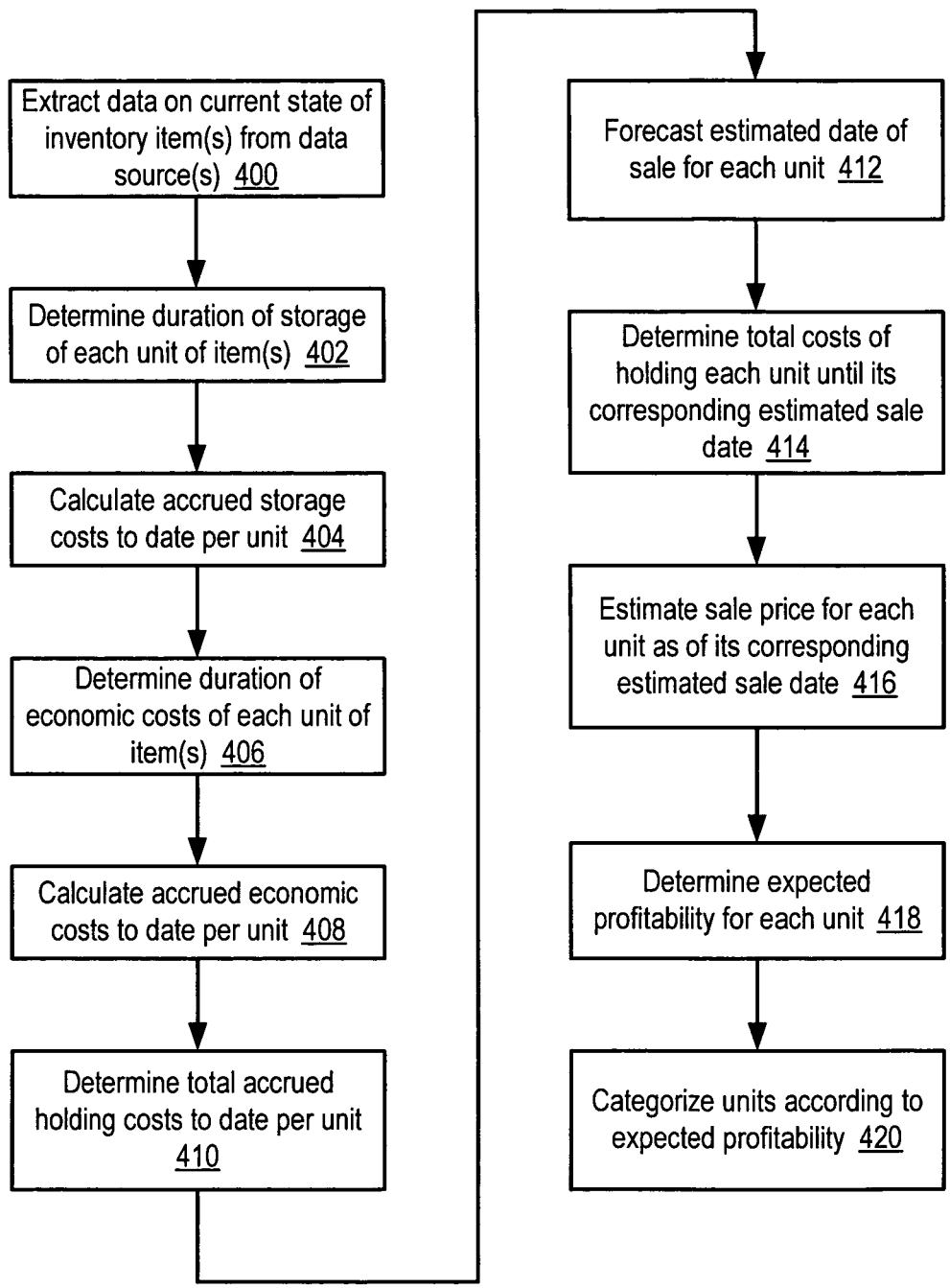
FIG. 4 is a flow diagram illustrating one embodiment of a method of evaluating expected profitability of inventory items.

As mentioned above, analysis of inventory metrics may yield information useful for managing inventory, for example to identify inventory items 35 that are actually unprofitable or at risk of becoming unprofitable due to excessive holding costs. One embodiment of a method of evaluating expected profitability of inventory items 35 is illustrated in FIG. 4. Referring collectively to FIGS. 1-4, operation begins in block 400 where data corresponding to the current state of one or more inventory items 35 is extracted from one or more data sources. For example, in one embodiment, manager 110 may be configured to consult inventory cost database 120 to extract records indicating how many units of a given item 35 are currently stored in inventory, when those units were acquired, the cost paid for the units, and/or other relevant item details that may be stored in inventory cost database 120. Additionally, manager 110 may be configured to consult purchasing records database 150 to determine the payment terms and status corresponding to units of given item 35. In some embodiments, manager 110 may be configured to store these extracted records within inventory metrics database 180 as described above, while in other embodiments manager 110 may be configured to store extracted records locally (e.g., within internal data structures) while they are analyzed.

Multiple transformation or analysis steps may then be performed on the extracted data in various orders. In the illustrated embodiment, the duration of storage of each unit of items 35 is determined (block 402). For example, in one embodiment manager 110 may be configured to use the date that a particular unit of an item 35 was received into inventory (e.g., as may be extracted from inventory cost database 120) to calculate the current storage duration of the particular unit in days, weeks, etc. The accrued storage cost to date for each unit of items 35 is then calculated (block 404). For example, in one embodiment manager 110 may be configured to apply storage cost parameters in conjunction with relevant item characteristics (e.g., as may be extracted from modeling parameters 160 and/or product details database 170) to determine storage costs appropriate to particular items 35, and then accumulate those costs for units of those particular items 35 according to their respective storage durations.

Similarly, a duration of economic costs for each unit of items 35 is determined (block 406). In some instances, economic liability for units of an item 35 may begin when the units are received into inventory, such that economic costs begin to accrue at roughly the same time that storage costs begin to accrue. However, as shown in FIG. 2 and described above, in some instances, economic liability for inventory units may begin some time after receipt of those units, depending on the payment terms of the supplier. Thus, in one embodiment manager 110 may determine the date economic liability began for a particular unit of an item 35 (e.g., referencing a payment date reflected in inventory cost database 120 or purchasing records database 150) and determine the duration of economic costs for that particular unit from the date of assumed liability. The accrued economic cost to date for each unit of items 35 is then calculated (block 408). For example, in one embodiment manager 110 may be configured to apply economic cost parameters (e.g., interest rates as reflected in modeling parameters 160) to determine economic costs appropriate to particular items 35, and then accumulate those costs for units of those particular items 35 according to their respective economic cost durations. It is noted that in some embodiments, economic costs may be assessed on storage and other costs associated with receiving and holding a unit of an item 35, in addition to the price paid for that unit. Also, in some embodiments, it is contemplated that economic and storage costs may be determined concurrently.

Total accrued holding cost to date for each unit of items 35 is then determined (block 410). In some embodiments, accrued holding cost may simply be the sum of storage and economic costs that may be determined as described above, while in other embodiments other costs or factors may be accounted for in determining the accrued holding cost.

An estimated or expected date of sale or other type of revenue transaction is then forecast for each unit of items 35 being analyzed (block 412). In some embodiments, forecast service 130 may be configured to directly determine an estimated sale date for each unit of items 35. Alternatively, in some embodiments manager 110 may determine an estimated sale date for a unit of an item 35 indirectly from a forecast of sales volume for that item 35. For example, manager 110 may provide an identifier of an item 35 to forecast service 130 and request a forecast of sales volume for the identified item 35. Responsively, forecast service 130 may provide a sales volume forecast on a daily, weekly or other time basis, which manager 110 may then translate into unit dates of sale.

For example, in one embodiment forecast service 130 may be configured to provide a six-week sales volume forecast for a given item 35. Continuing the example, on a given date of a requested forecast for given item 35, forecast service 130 may predict that at the end of weeks 1 through 6, the number of units of given item 35 sold during each week will be 1, 2, 2, 1, 0 and 0, respectively. Suppose that manager 110 requests the sales forecast on a date of, e.g., 10/18, at which time ten units of given item 35 are on hand. Manager 110 may then assign an expected sale date of 10/25 to a first unit, and expected sale dates of 11/1, 11/1, 11/8, 11/8 and 11/15 to the second through sixth units, respectively. In some embodiments, manager 110 may assign expected sale dates starting with the oldest units first, while in other embodiments a different assignment order may be employed. For the seventh through tenth units of given item 35, for which no sales are forecast during the current six-week forecast window, in one embodiment manager 110 may assign an estimated sale date corresponding to the end of the forecast window (e.g., 11/29). Alternatively, manager 110 may assign an earlier or later date, for example depending on an optimistic or pessimistic forecast bias. Such a bias may variously be reflected within system 50 as a modeling parameter, or may be returned by forecast service 130 as an indication of model confidence or other qualifying result.

Total costs of holding each unit of items 35 until its corresponding estimated sale date are then determined (block 414). For example, manager 110 may be configured to project storage and economic costs associated with holding a particular unit of given item 35 until its estimated sale date in a manner similar to calculating storage and economic costs that have actually accrued to date for the particular unit, as described above. In one embodiment, total costs of holding a unit of an item 35 until its corresponding estimated sale date may include storage and economic costs as well as initial costs paid for the unit itself. For example, initial unit costs may include the price paid to a supplier for the unit as well as transportation and receiving costs. In some embodiments, initial unit costs may be determined net of rebates or other initial cost adjustments that may include, for example, vendor-funded or manufacturer-funded marketing or promotional fees, price protection adjustments, etc.

For each unit of items 35, an estimated sale price or revenue as of each unit's respective estimated sale date is determined (block 416). For example, manager 110 may be configured to provide an identifier of an item 35 along with a forecasted sale date to pricing service 140. Responsively, pricing service 140 may be configured to estimate the sale price of identified item 35 on the supplied date. Alternatively, in some embodiments pricing service 140 may be configured to provide a sale price forecast over a window of time, in a manner similar to the sales volume forecast that may be provided by forecast service 130 as described above. Manager 110 may be configured in one embodiment to request an estimated sale price for a unit after a specific estimated sale date has been assigned to that unit, in a serial fashion. Alternatively, manager 110 may concurrently request a sales volume forecast and a price trend forecast, and assign estimate sale dates and prices to a group of units in the same step, such as block 412 described above. As noted above, future pricing and future volume may be interdependent variables. Consequently, in some embodiments, several iterations of estimation of future sale dates and future pricing (e.g., blocks 412, 416) with mutual feedback of results may be performed. For example, a fixed number of iterations may be performed, or iteration may continue until estimated future pricing and volume are reasonably stable (e.g., until both models converge).

An expected margin or profitability of each unit of items 35 is then determined (block 418). For example, in one embodiment, manager 110 may be configured to compare the estimated sale price of a unit of a given item 35 as of the unit's estimated date of sale against the total cost of holding the unit from the time it was acquired until the estimated date of sale, such as by subtracting the total cost from the estimated sale price. In some embodiments, manager 110 may perform a similar comparison as of the current date, using a current sale price for the unit and excluding holding costs beyond the current date.

Individual units of items 35 are then categorized according to their respective expected profitability (block 420). For example, if at any given time, the expected sale price for a unit of an item 35 does not exceed the total cost of the unit at that time, the unit may be unprofitable. In one embodiment, manager 110 may be configured to determine which of several categories applies to a particular unit of a given item 35. For example, a particular unit may be expected to be profitable as of its estimated date of sale (e.g., its expected price exceeds its total cost). Alternatively, the particular unit might be currently profitable (e.g., using current pricing and costs to date) but may be forecast to be unprofitable as of its estimated date of sale. That is, the particular unit may be at risk of becoming unprofitable. Finally, the particular unit may be currently unprofitable. For example, its holding costs to date (and/or declining sale price) may have eroded its profit margin. Other categories are possible and contemplated. In one embodiment, items 35 at risk of becoming unprofitable may be further categorized according to the primary source of the risk. For example, a given item 35 may be at risk because it has relatively little initial margin at the time of acquisition (thus being more susceptible to holding costs), because its accrued holding costs to date are large relative to current margin, because future expected holding costs are expected to be large as described above, or for other reasons. In some embodiments, such risk categories may be reported separately for further analysis.

In some embodiments, other profitability categories may apply to a given unit of items 35. For example, a minimum, positive threshold value of profitability may be specified for a given item 35 in one embodiment, such that a unit of given item 35 may be deemed unprofitable or at risk of becoming unprofitable if its expected sale price does not provide the required threshold of profitability, even if some positive margin is expected. Such a threshold may be used to offset risk in forecasting sales or pricing behavior, for example. Alternatively, negative profitability threshold values may be implemented for certain items 35, for example if a small or even significant loss on certain units is acceptable for other business reasons (e.g., by using such units as loss leaders to increase sales of other items 35). In various embodiments, profitability threshold values may be expressed as fixed dollar amounts, percentages of original unit cost, percentages of current or estimated total unit cost, or other suitable representations.

Generated inventory metrics are then stored for further analysis (block 422). For example, manager 110 may be configured to store estimated sale date, pricing and margin information as well as unit categorization information within inventory metrics database 180. In some embodiments, it is contemplated that such metrics may be stored as they are generated.

It is noted that in one embodiment, the above-described methodology may be implemented to determine expected profitability of items 35 at the level of individual units of items 35. That is, rather than treating all units of a given item 35 as a group and deriving an overall profit or loss expectation for the group, individual units may be identified as potentially profitable or unprofitable. Referring to the example given above, of the ten units of given item 35 analyzed, the first unit may be currently unprofitable (e.g., owing to accrued costs due to being the oldest unit on hand), the second through sixth units (forecast to be sold during weeks ending 11/1, 11/8 and 11/15) may be expected to be profitable, and the remaining units (not forecast to sell within the current forecast horizon) may be at risk of becoming unprofitable.

Such individual unit-level granularity of profitability analysis may enable unit-level action to be taken to address potential profitability issues. In one embodiment, manager 110 may be configured to notify disposition service 190 regarding the expected profitability of various units of items 35. For example, manager 110 may indicated to disposition service 190 that a certain number of units of a given item 35 are determined to be unprofitable or at risk of becoming unprofitable. As described in greater detail below in conjunction with the descriptions of FIGS. 5-8, disposition service 190 may be configured to individually determine a disposition for the indicated units dependent upon their expected profitability. For example, units may be liquidated or sold via channels other than the normal sales channel through fulfillment center 10.

It is contemplated that numerous other inventory metrics may be determined from data extracted from data sources and services within inventory management system 50. For example, in various embodiments, manager 110 may be configured to determine and report the rate at which various items 35 are disposed of via disposition service 190, the status of the disposition process for each of various items 35, performance of items 35 against profitability expectations, and other types of metrics.

In some embodiments, manager 110 may be configured to analyze expected profitability of all items 35 stored within a fulfillment center 10 on a recurring basis, such as daily, weekly, or at other regular or irregular intervals. For example, in one embodiment manager 110 may be configured to perform an analysis of all inventory on a weekly basis, to store the resulting metrics within inventory metrics database 180, and to notify disposition service 190 of the possibly or actually impaired profitability of certain units of items 35. In other embodiments, expected profitability of different items 35 may be analyzed at different times, and possibly triggered by different events. For example, in one embodiment, ordering or receiving of certain items 35 may trigger an analysis of expected profitability of units of those items 35. It is also contemplated that in some embodiments, profitability analysis may not occur with greater frequency than is supported by the resolution or granularity of the models used in the analysis (such as the models employed by forecast service 130 and/or pricing service 140). For example, if sales activity is forecast with weekly or biweekly granularity, analyzing profitability more frequently than weekly or biweekly may not substantially improve the quality of the analysis.

While in one embodiment, manager 110 may be configured to autonomously perform an expected profitability analysis and to notify disposition service 190 dependent upon the analysis, in some embodiments the metrics extracted and generated by manager 110 may be available for further analysis by users. In some embodiments, clients 101a-b may be configured to access inventory metrics database 180, for example to retrieve reports on the current status of inventory items 35 or to request that a new analysis be performed. Clients 101a-b, in various embodiments, may include applications, web browsers, or other types of interfaces through which users may interact with inventory metrics database 180. In some embodiments, clients 101a-b may be configured to access other elements of inventory management system 50, either directly or via manager 110. For example, in one embodiment a client 101 may be configured to retrieve of modify the contents of purchasing records 150, such as to initiate or approve a purchase order transaction. Similarly, a client 101 may be configured to access inventory cost database 120 to record the arrival or departure of various items 35.

Clients 101a-b may be configured to perform inventory optimization analyses using the various inventory metrics available through database 180, in various embodiments. For example, clients 101a-b may be configured to identify underperforming items 35, such as items 35 that are marginally or erratically profitable. Additionally, clients 101a-b may be configured to analyze the overall mix of items 35 stored within fulfillment center 10, for example to ascertain whether substituting certain items 35 having particular storage or cost characteristics for other items 35 might improve overall profitability or usage of inventory storage resources (e.g., by replacing large items 35 with smaller items 35 having equal or better expected profitability).

In some embodiments, inventory management system 50 may be implemented by a single enterprise or business, such as a retail merchant conducting electronic or physical commerce, for the management and analysis of its own inventory items 35. However, in other embodiments, different opportunities may exist for one enterprise to offer inventory management services, including the generation and analysis of inventory metrics such as expected profitability, to other customers or businesses. For example, in one embodiment, an enterprise may provision and license a version of inventory management system 50 to other merchants who maintain their own fulfillment infrastructure. Alternatively, external merchants that maintain their own fulfillment infrastructure may choose to expose some of their information systems to another enterprise for inventory management services. For example, in one embodiment a merchant may maintain its own data sources and/or forecast services, and may expose these sources and services to external inventory management logic, such as the analysis algorithms implemented via manager 110. In one such embodiment, some elements of inventory management system 50 may be implemented at a client site (e.g., many of the data sources and services) while other elements may be implemented at a host site of the enterprise providing inventory management services. Such services may be provided via any of a number of interfaces and financial arrangements. For example, a client may receive inventory management services via web services interface 105 or via another type of interface on a pay-per-use, subscription or licensed basis.

Numerous other inventory management services arrangements are possible and contemplated. For example, in one embodiment, a host enterprise may offer fulfillment services as well as inventory management services to other merchants or organizations that choose not to build their own fulfillment infrastructure. In such an embodiment, inventory not owned by the host enterprise may share various aspects of the receiving, storage and packing functions of fulfillment center 10. In some such embodiments, the host enterprise may offer to track and manage inventory metrics and to provide fulfillment services for externally-owned inventory items 35 alongside host-owned inventory items 35, and to provide inventory metrics services to outside merchants, such as via web-services interface 105 or another type of interface. In some embodiments, certain merchants may maintain their own e-commerce or other customer interfaces while delegating order fulfillment and inventory management to the host enterprise. Other merchants may choose to use customer interfaces provided by the host enterprise, such as web-based or physical storefronts, in addition to host-provided order fulfillment and inventory management services.

More generally, it is contemplated that the methods and techniques for determining and analyzing inventory metrics as described above (as well as inventory disposition as described below) need not be restricted to inventory items 35 that are owned or in the physical possession of an enterprise. Generally speaking, inventory items for which inventory metrics may be determined may encompass items at any point within a supply chain between a producer and a consumer. That is, in some embodiments the concept of inventory may be virtualized or extended beyond the physical confines of a single inventory storage facility (such as a fulfillment center 10) to include a number of different types or categories of inventory. For example, in some embodiments, inventory items may include forward-deployed inventory, such as inventory held in facilities (e.g., shipping hubs of common carriers) relatively close to customers or recipients. Inventory items may also include items that are in transit from a supplier, to a customer, or between facilities. In some embodiments, inventory items may also include items not actually owned or ordered by an enterprise, but which are items held in reserve by a supplier on behalf of the enterprise, such as specially allocated items or items for which an enterprise holds an option to purchase under specified terms. It is contemplated that in some embodiments, inventory items that fall into any of these extended categories may have acquisition and holding costs unique to each particular category, which costs may be measured and attributed to individual items in a manner similar to that described above.

Disposition Service

In many embodiments, units of an inventory item 35 may typically leave fulfillment center 10 through a normal sales or fulfillment channel, for example in response to an actual or expected customer order. However, not all units of inventory items 35 may be sold or disposed of through a typical channel. For example, some units may be damaged upon receipt from a supplier or at some point during storage within fulfillment center 10, and consequently not sellable as new-condition merchandise. Also, as described above, in some embodiments certain units of particular items 35 may be identified as at risk of or actually failing to meet profitability, volume or other expectations, even though such units may otherwise be sellable as new. For these or other reasons, in one embodiment units of items 35 may be disposed of through one or more disposition channels.

Figure 5:
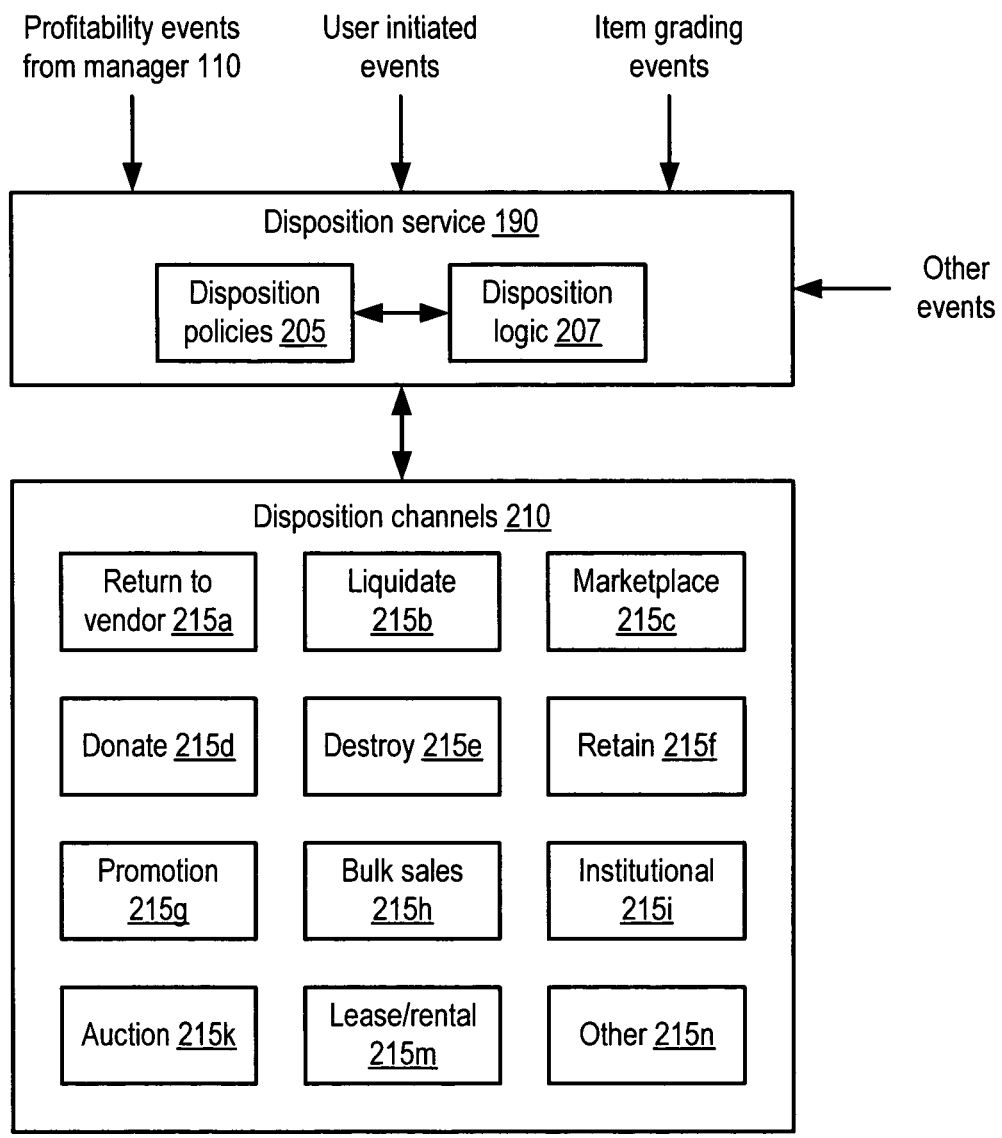
FIG. 5 is a block diagram illustrating one embodiment of a disposition service configured to interact with a number of disposition channels.

Numerous possible channels for disposing of inventory may exist in some embodiments, but not all possible channels may be equally applicable or desirable for different types of items 35. FIG. 5 illustrates one embodiment of a disposition service 190 that may be configured to evaluate each of a number of disposition channels with respect to a given item 35 and to select a particular disposition channel through which to dispose of the given item 35. In the illustrated embodiment, disposition service 190 includes a set of disposition policies 205 configured to interact with disposition logic 207. Further, disposition service 190 may be configured to interact with a number of disposition channels 210.

In the illustrated embodiment, disposition service 190 may be triggered to evaluate and select a particular disposition channel 210 for a unit of a given item 35 in response to detecting a disposition event associated with given item 35. Generally speaking, a disposition event may include any exceptional event associated with an item 35 indicative of the possibility that units of the item 35 may be candidates for disposal through alternative channels. For example, a disposition event may include a message or notice that identifies the nature of the event as well as the item or items 35 to which the event applies. In various embodiments, a disposition event may be communicated to disposition service 190 via any suitable type of interface, such as a web services interface or a custom application programming interface (API).

In one embodiment a disposition event may include a notification from inventory management system 50, e.g., via manager 110, that units of a particular item 35 have unacceptable expected profitability, or that the inventory mix within fulfillment center 10 is being shifted to deemphasize particular item 35, for example. A disposition event may also include item grading events, which in one embodiment may be indicative that one or more units of particular item 35 has been determined to be in a condition or grade other than the default condition (e.g., new condition). For example, an item grading event may occur in response to detecting that a unit of an item 35 is damaged, such as upon receiving, stocking or picking the unit. In various embodiments, a disposition event may occur in response to an item grading event. For example, a disposition event may be triggered upon initiation or completion of item grading. In some embodiments, users may manually initiate disposition events, for example in response to a decision to discontinue or liquidate an item 35. Other types of disposition events may also serve as triggers to disposition service 190. For example, a supplier or manufacturer may initiate a recall of an item 35, and may notify clients of such a recall via an appropriate disposition event.

Generally speaking, a disposition channel may correspond to any suitable method, technique or relationship through which a unit of an item 35 may be disposed of. In the illustrated embodiment, numerous different disposition channels 210 may be provided, which may vary in terms of the potential value received for disposition of an item. In one embodiment, disposing of a unit of an item 35 via return-to-vendor channel 210*a* may include arranging to deliver the unit to its supplier or a designee of the supplier in exchange for a credit or refund of all or a portion of the price paid for the unit. Liquidating the unit via channel 210*b* may in one embodiment include selling or consigning the unit to a third party liquidator. In various embodiments, the liquidation price may be prearranged with the liquidator to be a flat price or percentage of a retail or wholesale price. Alternatively, a liquidator may bid on a specific lot of units as they become available. In some embodiments, liquidation may present a quick or convenient option for item disposition at the expense of value received, as described in greater detail below.

In some embodiments, depending on the condition of the item 35 being disposed of, alternatives to liquidation may include the bulk sales and institutional channels 210*c-d*. For example, individuals, organizations or institutions may enter into arrangements with a merchant to purchase large quantities of items 35 in various conditions and at various levels of discounting for resale or for institutional use.

For various business reasons, a merchant may prefer to attempt to dispose of certain items 35 itself rather than to liquidate or sell through bulk or institutional channels. For example, the merchant may ultimately obtain a higher price for units of some items 35 by discounting or promoting them. In one embodiment, disposing of units of an item 35 through promotional channel 210*e* may include applying a discount or promotional offer to those units, such as free shipping, favorable payment terms, or discounted bundling with other merchandise. In other embodiments, disposing of an item 35 through promotional channel 210*e* may include using item 35 as a loss leader or giving it to a customer without charge, for example as an inducement to buy another item 35 (e.g., "buy item X, get item Y free") or to build customer goodwill by rewarding loyal customers. In one embodiment, the value received for a given item 35 disposed of via promotional channel 210*e* may simply be the sales price net of discounts or other offers. However, in some embodiments, an economic value may be associated with generating customer goodwill or potentiating sales of other items 35 through the use of promotions. Such intangible or indirect value may be quantified and added to the tangible value received for a given item 35 disposed of via promotional channel 210*e*.

A merchant may also attempt to avoid externally liquidating items 35 by disposing of them via an alternative channel associated directly with the merchant. For example, the merchant may operate outlet or clearance facilities affiliated with, but separate from its primary sales facilities. In one embodiment, disposing of units of an item 35 through marketplace channel 210*f* may include offering them for sale through a secondary marketplace affiliated with the merchant. For example, a merchant engaging in electronic commerce (e-commerce) may maintain a primary e-commerce portal (e.g., a website) including a catalog listing new items 35 available for purchase from the merchant. The merchant may also provide a separate marketplace listing alternatives to the new items 35 offered via its primary catalog, such as used or damaged versions of items 35 or new items 35 available through other sellers affiliated with the merchant (such as sellers contracting with the merchant for fulfillment and/or inventory management services as described above, for example). In some embodiments, marketplace channel 210*f* may be directly linked with a primary e-commerce portal. For example, an e-commerce website may be configured to list a given item 35, in new condition and available directly from the merchant, on a respective catalog page of the website. Additionally, the merchant may provide listings of alternate sources of the given item 35 in new, used or damaged condition on the same catalog page, or on a web page linked to the catalog page. Generally speaking, a listing may encompass any type of presentation of an available item. For example, a listing may include a brief enumeration of item details along with a link to a page including more item information and/or purchase information.

In some embodiments, marketplace channel 210*f* may provide a venue for commerce that benefits from association with a merchant hosting the channel, but which may have different business policies or characteristics relative to a merchant's primary sales channel(s). For example, different warranty, return or shipping policies may apply to items sold through marketplace channel 210*f* versus a primary catalog sales channel. Also, in some instances, although a merchant may list various items 35 as available for purchase through marketplace channel 210*f*, the merchant may or may not actually own or have possession of some of the listed items 35. For example, in one embodiment, a merchant may sell a lot of underperforming items 35 (e.g., items identified as potentially or actually unprofitable as described above) to another party who elects to offer them for sale through marketplace channel 210f. The merchant may retain actual possession of the items 35 within fulfillment center 10 and handle fulfillment services for those items on behalf of the other party as they are sold; however, financial liability for the items 35 may rest with the other party. In other embodiments, third parties may offer items 35 in their own possession for sale through marketplace channel 210f. In some such embodiments, the merchant hosting marketplace channel 210f may process order entry and/or payment for such items 35, while the third parties may handle order fulfillment. In some embodiments, the merchant may apply its own sales policies, such as satisfaction guarantees or return policies, to items sold by third parties through marketplace channel 210f.

In some instances, a unit of an item 35 may not be a candidate for disposition via the channels 210 described above. For example, the unit may be too damaged or depreciated to expect a reasonable value from sale through any channel. In some embodiments, items 35 that are not candidates for other disposition channels 210 may be donated (e.g., to charities, schools, etc.) via donation channel 210g or destroyed via channel 210h. It is noted that in some embodiments, value may still be associated with disposition of an item 35 even in the absence of a sale. For example, tax benefits may be available for donated or damaged items 35. Also, donated items may generate intangible goodwill value, and damaged items 35 selected for destruction may have salvage value (e.g., for wood pulp, scrap metal, recyclable plastic, etc.).

In some embodiments, certain items 35 may be disposed of through an auction via an auction channel 210k. Additionally, rather than a sale or similar nonrecurring transaction, in some embodiments disposition of items 35 may include a possibly recurring lease or rental transaction, e.g. via a lease/rental channel 210m. For example, a video or DVD having damaged retail packaging may in some embodiments be suitable for repackaging as a rental unit. Other disposition channels 210 are possible and contemplated, and are represented generically by the "other" channel 210n.

Further, in some instances disposition service 190 may determine that a unit of an item 35 for which a disposition event has been detected should be retained in inventory. For example, retention may be an option if no other desirable disposition option exists at the time the disposition event occurred, but a merchant wishes to reevaluate disposition options at a later time. Alternatively, a merchant may determine that some items 35 that are candidates for some kind of disposition may be retained for future promotional purposes (e.g., sold as loss leaders or offered as gifts to certain customers to build goodwill) but may not immediately enter promotional channel 210e. For example, units of certain items 35 may be retained until a seasonal promotion begins, market conditions improve, etc. The option to retain an item is illustrated as retention channel 210i, although in some embodiments, the decision to retain units of an item 35 may be implemented as taking no action with respect to those units (e.g., leaving them in inventory). It is noted that in some instances, units of an item 35 may be retained as inventory even though they may be actually or potentially unprofitable. Likewise, in some instances units of an item 35 may be disposed of through one or more of channels 210 even though they may be expected to be profitable (for example, due to a decision to reposition inventory, discontinue certain business lines, etc.). That is, although a determination regarding profitability may in some cases be a sufficient condition to trigger disposition or retention, it need not be a necessary condition.

It is contemplated that in some embodiments, some of the above-described channels 210 may be omitted, or additional channels 210 may be provided. Additionally, it is contemplated that in some embodiments, various channels 210 may be dynamically added or deleted, for example as supplier or liquidator relationships change, or as new disposition strategies are developed. Further, in some embodiments a normal sales or fulfillment channel (e.g., a retail channel) may be considered as one of disposition channels 210 for the purposes of analysis. In one such embodiment, an inventory item 35 may always be associated with one of channels 210, but items 35 may be redirected to different channels 210 depending on various events. For example, an item 35 may be associated with a normal or default channel 210 when it is initially placed in inventory. Such an item 35 may be redirected to a different channel 210 in response to a disposition event corresponding to that item, such as detected damage requiring evaluation or grading, a profitability event triggered by inventory management system 50, or another type of event.

Not all disposition channels 210 may be valid channels for disposing of a unit of a given item 35, depending on the properties of the given item 35 or the condition of the unit. For example, some manufacturers will not allow their brands to be discounted or sold through secondary channels, which may disqualify promotional channel 210e and/or marketplace channel 210f from being valid disposition options for units of such items 35. Similarly, some suppliers or liquidators may not accept units of items 35 that are not in new or repairable condition, which may disqualify return-to-vendor channel 210a or liquidation channel 210b from being disposition options for units in poor condition. In one embodiment, disposition policies 205 may be configured to store and evaluate disposition policies that may apply to items 35. For example, when a disposition event for a unit of an item 35 is detected, disposition policies 205 may determine what channels 210 are valid disposition options for the unit given relevant details about the type and condition of the unit.

Figure 6:
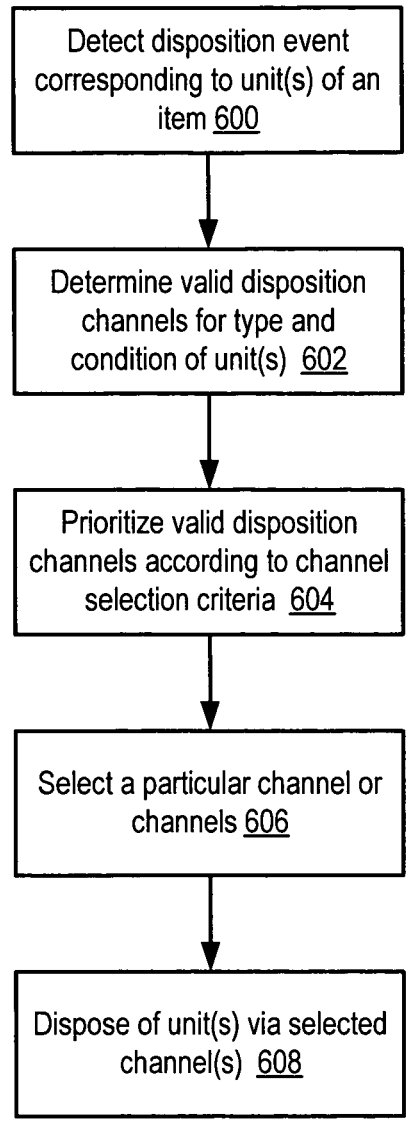
FIG. 6 is a flow diagram illustrating one embodiment of a method of disposing of units of items.

In response to a detected disposition event for one or more units of a given item 35, in one embodiment disposition logic 207 may be configured to evaluate the disposition channels 210 that are valid for the units (e.g., as determined by the application of disposition policies 205) and may select a particular channel 210 through which to dispose of one or more units. One embodiment of a method of disposing of units of items 35 that may be implemented by disposition service 190 is illustrated in FIG. 6. Referring collectively to FIGS. 5 and 6, operation begins in block 600 where a disposition event is detected. For example, in one embodiment disposition service 190 may detect a profitability event generated by inventory management system 50 and conveyed via manager 110, an item-grading event generated by a fulfillment center associate who detects a damaged unit of an item 35, or another type of disposition event. As noted above, in some embodiments a disposition event may identify the type of item 35 as well as the condition of the particular unit(s) to which the event corresponds.

In response to the disposition event, valid disposition channels 210 for the type and condition of the unit(s) corresponding to the event are determined (block 602). For example, disposition policies 205 may be configured to take into account item-specific and/or condition-specific contingencies that may apply to various channels 210, as described above. In some embodiments, a default channel 210 (such as, e.g., retention channel 210i) may be defined such that at least one valid disposition channel 210 exists for a given unit.

The valid disposition channels 210 are then prioritized according to channel selection criteria (block 604). For example, in one embodiment, disposition logic 207 may be configured to maximize the value received for disposing of the unit(s), such as by ranking the valid disposition channels 210 by the amount of value recoverable through each channel 210. In some instances, the expected recovery value from a channel may be predetermined for a given item 35 and/or unit condition. For example, a vendor or supplier may, as a matter of policy, credit all or a fixed portion of the price paid for the item 35 when a unit of that item 35 is returned via return-to-vendor channel 210a. Similarly, in some cases a liquidator may maintain a fixed or standing bid to acquire certain items 35 via liquidation channel 210b. In other instances, the expected recovery value from a channel may be dependent upon market factors. For example, attempts to dispose of units of an item 35 via marketplace channel 210f may depend upon the willingness of one or more customers to pay the price listed. More details about pricing items 35 for disposition through marketplace channel 210f are given below. As noted above, in some embodiments intangible or indirect value such as customer goodwill, tax benefits, salvage value, etc. may be taken into account in determining the expected recovery value from a given channel 210.

In some embodiments, the criteria by which channels 210 are evaluated and compared may be dynamic rather than static. For example, some channels (such as, e.g., liquidation channel 210b) may bid different prices for units of items 35 at different times or depending on the quantity of units available at a given time. Correspondingly, in some embodiments it is contemplated that some or all of channels 210 may include an API or interactive service interface, such as a web services interface, through which the channel 210 may be notified by disposition service 190 of available units of items 35 and may respond with a bid or other information. For example, in one embodiment disposition logic 207 may be configured to query valid disposition channels 210, such as by issuing a web services request or other type of bid request indicating the type, quantity, condition and/or other pertinent details of available units of a given item 35 to an interface associated with each valid disposition channel 210. Each valid disposition channel 210 may then determine whether to bid on some, all or none of the indicated units and respond to the request accordingly, e.g., with a bid price and quantity, purchase terms, etc. Disposition logic 207 may then evaluate the resulting bids and prioritize channels 210 according to the evaluation.

It is contemplated that in other embodiments, the valid disposition channels 210 may be prioritized according to criteria in addition to or other than maximizing recoverable value from channels 210. For example, in some embodiments, disposition logic 207 may take into account the quantity of items 35 corresponding to the disposition event and the likelihood of disposing of most or all of that quantity via some combination of channels 210. That is, the capacity of a given channel 210 to handle various numbers of units of an item 35 may be accounted for when prioritizing and selecting disposition channels 210. In some instances, a lower average recoverable value from a particular channel 210 may be outweighed by a larger channel capacity, particularly in situations where a substantial number of units are to be disposed of. In some embodiments, different units of a given item 35 may be disposed of through different channels 210.

Additionally, in some embodiments disposition logic 207 may apply a positive or negative bias to certain channels 210. For example, in one embodiment a merchant may, as a matter of policy, prefer to dispose of some or all items 35 through a channel associated with the merchant's brand, market presence, e-commerce portal, etc. in order to maximize customer impressions and associations with the merchant. Such a merchant may prefer that items 35 be disposed of through marketplace channel 210f versus liquidation channel 210b, for example. Thus, in some embodiments, disposition logic 207 may implement a positive bias towards marketplace channel 210f, a negative bias towards liquidation channel 210b, or both. Such a bias may be implemented, for example, by adding a bias value to or subtracting it from the expected recovery value, or through any other suitable technique. It is noted that in some instances, a negatively biased channel 210 may still rank higher than a positively biased channel 210, for example if the expected recovery value from the negatively biased channel significantly exceeds the cost associated with the negative bias. Also, it is noted that in some embodiments, biases may be internal to disposition service 190. That is, channels 210 need not be aware of how they are biased relative to each other.

Once valid disposition channels 210 have been prioritized according to the implemented prioritization scheme, taking into account any relevant biases, a particular channel 210 is selected (block 606). For example, in one embodiment the highest-ranking channel 210 may be selected. In other embodiments, a different channel 210 may be selected, for example if a user manually overrides the highest-ranking channel 210. Also, in some embodiments, multiple different channels 210 may be selected. For example, one channel 210 may not be able to accommodate all units of a given item 35 identified for disposal, or disposition logic 207 may be configured to attempt to diversify recovery of costs through a combination of channels 210.

Finally, the unit(s) corresponding to the disposition event are disposed via the selected channel or channels 210 (block 608). For example, the unit(s) may be physically conveyed to a supplier, liquidator or other entity, or they may be held in inventory and listed via a sales channel such as marketplace channel 210f.

In some embodiments, it is contemplated that disposition service 190 may be configured to operate in a mode in which disposition options for a unit of an item 35 are evaluated, but action to dispose of such a unit (e.g., block 608 of FIG. 6) may not actually be taken. Such a mode of operation may be referred to as a simulation mode, an evaluation mode, or a speculative mode of operation of disposition service 190.

For example, in some instances a disposition event may occur with respect to a particular unit of a given item 35 due to damage. However, it might require significant cost (e.g., in term of time, effort, equipment, supplies, etc.) to grade the particular unit in order to definitively determine its condition (e.g., cosmetically vs. functionally damaged). For example, a complex electronic device might require substantial testing to ascertain its level of operability. In some instances, such as with expensive or complex items 35, the cost of effort needed to ready a damaged unit for disposition through certain channels (by testing, repairing, refurbishing, etc.) may not compare favorably with the value expected from those channels. For example, the cost to repair a damaged unit may exceed the expected value of selling the repaired unit.

Correspondingly, in one embodiment disposition service 190 may be configured to evaluate disposition options for a unit of a given item 35 before the condition of that unit is determined. Specifically, in one embodiment, disposition logic 207 may evaluate channels 210 in view of disposition policies 205 to identify and present one or several valid disposition options. An agent external to disposition service 190 (such as an employee within fulfillment center 10 or an external client interacting through web services interface 105) may then determine whether to proceed to evaluate the condition of the unit given the presented options. For example, disposition policies 205 may restrict the channels 210 available for disposition of certain items 35, such that a damaged unit of a particular brand or type of item 35 may not be resold to a consumer. In such a case, disposition service 190 may evaluate any remaining valid channels 210, such as the potential credit from return-to-vendor channel 210a, potential salvage or scrap value, etc.

When operating in a simulation mode such as described above, disposition service 190 may have incomplete information regarding a unit of an item 35. For example, as described above, disposition service 190 may lack detailed information about the current condition of the unit, or whether the unit may feasibly be restored to a particular condition. Correspondingly, in a simulation mode, disposition service 190 may in various embodiments be configured to evaluate disposition options for the unit under a fixed assumption about the condition of the unit (e.g., a worst-case or best-case assumption) or may perform multiple different evaluations according to multiple different possible conditions. For example, disposition options (and corresponding expected recoverable values) may vary depending on whether a unit is unsalvageable, completely repairable, or somewhere in between. Disposition service 190 may evaluate and present disposition options for each of several possible or likely unit conditions, which may then be used to determine how to proceed with a particular unit (e.g., to grade its condition or to dispose of it as-is).

It is noted that when operating in a simulation mode, disposition service 190 may not actually change any persistent internal state or the state of channels 210. That is, in such a mode, disposition service 190 may not actually cause disposition actions to be taken (such as listing an item for sale via marketplace channel 210f, notifying a liquidator of an item to consign, etc.). Additionally, in such a mode, disposition service 190 may not modify the state of other units of items 35 within channels 210. For example, in some instances, actually attempting to dispose of a large number of units of an item 35 may alter the market for those units. However, in one embodiment, the actions of disposition service 190 in a simulation mode of operation may be transparent with respect to channels 210.

In some embodiments, a simulation mode of disposition service 190 may be offered by an enterprise to external merchants or partners as a service, such as a web service via web services interface 105, in a manner similar to inventory metrics generation and analysis as described above. In some such embodiments, an external partner or merchant may supply its own set of disposition policies 205 and channels 210, and may rely on disposition service 190 solely for evaluation and recommendation. In other embodiments, the service received by an external partner or merchant may encompass both evaluation and execution of disposition, either through channels 210 defined by the partner or merchant, through channels 210 presented by the enterprise providing the service, or a combination.

Marketplace-Based Pricing

As described above, in some embodiments marketplace channel 210f may be a valid channel through which to dispose of units of an item 35. Further, in some embodiments disposition service 190 may be configured to bias marketplace channel 210f in favor of other disposition channels 210. For example, a merchant may prefer to make a direct customer impression (i.e., a sale associated directly with the merchant) via marketplace channel 210f as opposed to liquidating merchandise for others to sell. Also, in many cases a better price may be obtained by selling directly to consumers via marketplace channel 210f versus selling items in quantity to a liquidator or other intermediate party.

However, sales through marketplace channel 210f may present additional challenges when evaluating disposition channels 210 to select a particular channel 210 through which to dispose of units of a given item 35. For example, as described above, the expected recovery value for a particular unit from a given channel 210 may be a primary input in the ranking of channels 210 in some embodiments. However, the expected recovery value from marketplace channel 210f may be difficult to quantify. For example, numerous different sellers may be selling units of given item 35 in varying conditions via marketplace channel 210f for different prices. If a unit is not priced appropriately when listed within marketplace channel 210f, it may sell for too little (thus sacrificing potential recovery value) or it may not sell at all, depending on competing listings.

Figure 7:
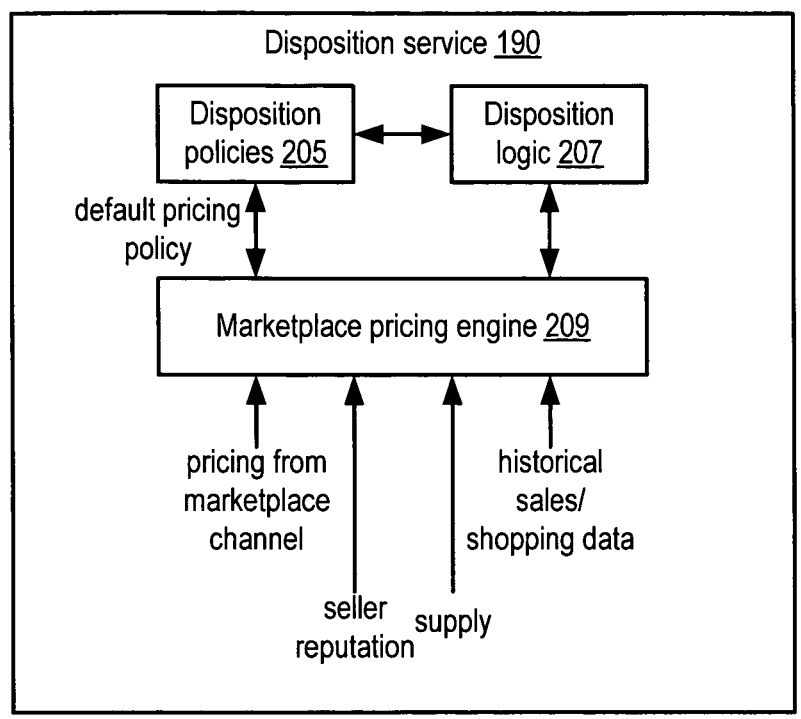
FIG. 7 is a block diagram illustrating one embodiment of a disposition service including a marketplace pricing engine.

In the embodiment illustrated in FIG. 7, disposition service 190 may be configured to implement a marketplace pricing engine 209 in addition to disposition policies 205 and disposition logic 207. Marketplace pricing engine 209 (or simply, engine 209) may be configured to provide pricing information to disposition logic 207 for units of a given item 35, taking into account a number of factors such as pricing for existing and historical listings within marketplace channel 210f for given item 35 or similar items, other historical sales and/or shopping information associated with given item 35, the reputation or rating of various competing sellers listing given item 35 via marketplace channel 210f, the supply of given item 35, and/or other factors.

Figure 8:
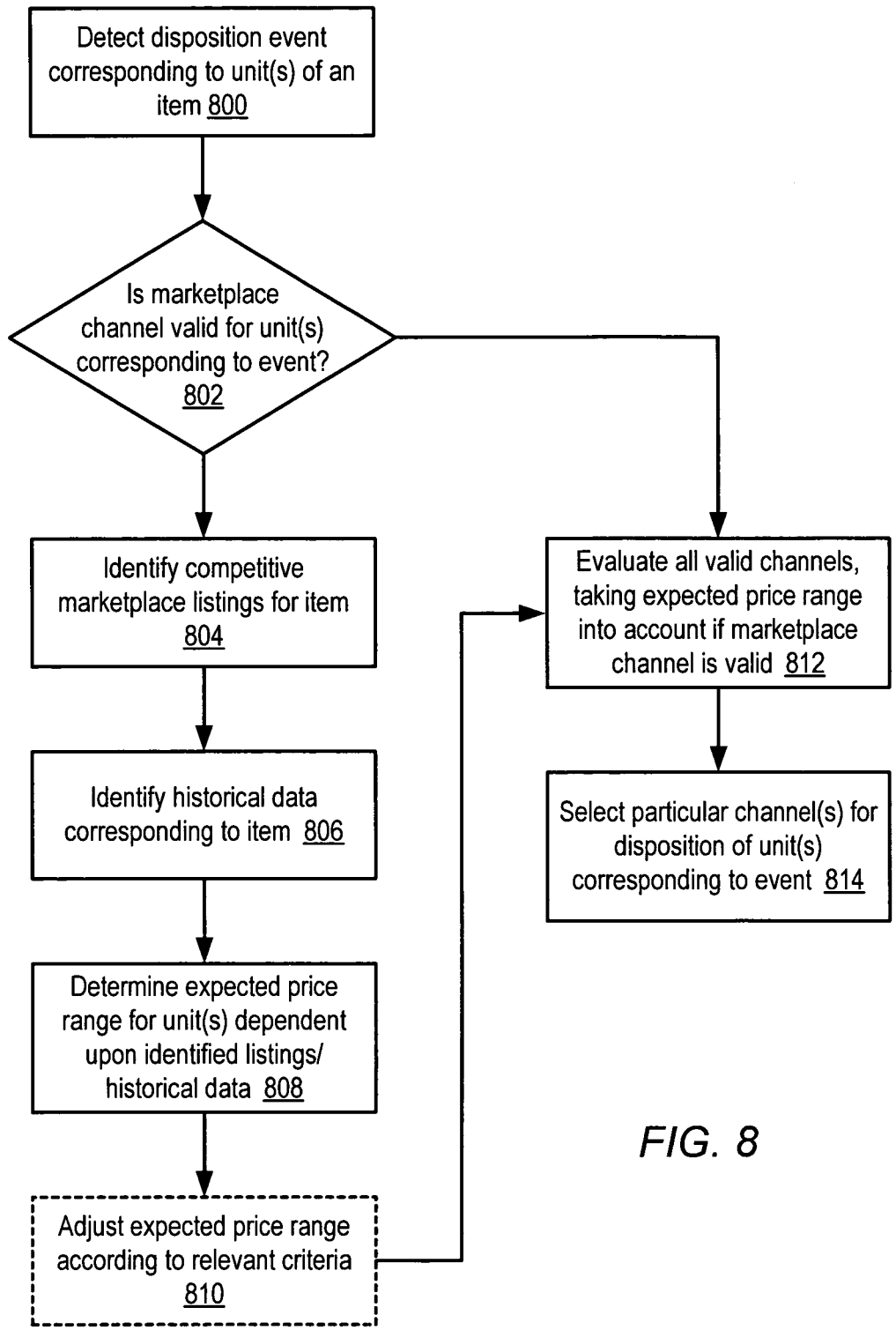
FIG. 8 is a flow diagram illustrating one embodiment of a method of operation of a disposition service including a marketplace pricing engine.

One embodiment of a method of operation of an embodiment of disposition service 190 that includes marketplace pricing engine 209 is illustrated in FIG. 8. Referring collectively to FIGS. 7-8, operation begins in block 800 where a disposition event for one or more units of a given item 35 is detected, such as described above in conjunction with the descriptions of FIGS. 5-6. Once a disposition event is detected, it is evaluated to determine whether marketplace channel 210f is a valid disposition channel for the indicated units (block 802). For example, disposition policies 205 may indicate that certain types or conditions of items 35 are not valid candidates for sale through marketplace channel 210f.

If marketplace channel 210f is not a valid disposition channel for the indicated units, in the illustrated embodiment execution may proceed from block 812 without consulting marketplace pricing engine 209. However, in some embodiments the following marketplace pricing steps may still be evaluated for informational purposes, e.g., to provide feedback to a user who may choose to manually override disposition policies 205 and list the unit via marketplace channel 210f anyways.

If marketplace channel 210f is a valid disposition channel, or in embodiments where marketplace pricing is evaluated regardless of the validity of marketplace channel 210f for an item 35, pricing analysis begins in block 804 where competitive listings for the given item 35 are identified. For example, in one embodiment, marketplace pricing engine 209 may search through listings of all items 35 offered for sale via marketplace channel 210f in order to identify listings matching the given item 35, where the listing offers given item 35 in at least the condition given for the unit(s) corresponding to the disposition event. That is, if the disposition event indicates that the unit(s) are in new condition, engine 209 may only consider listings for new units of given item 35, while if the disposition event indicates that the unit(s) are in "good" condition (i.e., less than new), engine 209 may consider listings for both "good" condition and new units of given item 35. If no listings are found that match the specified item criteria, in some embodiments engine 209 may attempt to identify listings for similar items 35 or units of the given item 35 in other conditions. However, any listings identified in this case may be flagged as being potentially unreliable for pricing purposes.

Historical data corresponding to the given item 35 is also identified (block 806). For example, in one embodiment engine 209 may be configured to analyze past sales history of units of the given item 35 through marketplace channel 210f or through other channels (including the merchant's primary sales channel). Such sales history may include the sale price of the given item 35 as well as other information pertinent to the sale, including data regarding the reputation or ranking of a third-party seller, duration of a listing prior to sale, condition of the given item 35 for a particular listing, any price adjustments that occurred during the course of the listing, etc. In some embodiments, historical data may also include customer shopping data not necessarily correlated with a sale. For example, a merchant may collect and store details regarding how users interact with its e-commerce portal, such as the specific catalog items 35 a user views, how much time users spend viewing certain items or pages, and other shopping-related data. In some embodiments, engine 209 may be configured to consult customer shopping data relevant to the given item 35, e.g., to ascertain its historical level of customer interest. In some embodiments, engine 209 may only identify historical data corresponding to given item 35, such as sale or shopping data, if no marketplace listings for the given item 35 were identified in the previous step, while in other embodiments, engine 209 may use historical data in conjunction with current marketplace listings to qualify pricing decisions.

An expected price range for the unit(s) of given item 35 corresponding to the detected disposition event is then determined dependent upon the identified marketplace listings and/or historical data (block 808). For example, in one embodiment, engine 209 may be configured to determine a minimum expected price for the unit(s) as the lowest-priced marketplace listing for the given item 35 in comparable or better condition, less a certain amount or percentage (e.g., one penny or 1% lower than the lowest comparable price). Correspondingly, in one embodiment, the maximum expected price may be determined from the highest-price listing for the given item 35. In some embodiments, the structure of marketplace channel 210f may be taken into account when determining the expected price range. For example, in one embodiment, marketplace channel 210f may be configured to display a fixed number of listings for the given item 35 on one web page. In such an embodiment, the maximum expected price may be determined as the maximum price such that the unit(s) will be listed on a given page of listings. For example, if engine 209 is configured to attempt to list the unit(s) on the first page of listings that includes N listings, the maximum expected price may be determined as the average of the Nth and (N−1)th listings on the first page, or alternatively as a certain amount below the Nth listing.

The expected price range may be determined according to a more sophisticated analysis of the identified marketplace listings and/or historical data, in some embodiments. Simply determining the minimum expected price as some amount less than the lowest-price current listing, as described above, may enable the unit(s) to sell relatively quickly. However, in some instances the lowest-price current listing may not be an accurate indicator of the minimum fair marketplace value of given item 35. For example, a seller may list a unit of given item 35 for an artificially deflated price to attract customer attention, or to attempt to earn revenue from shipping or processing fees. In some such instances, a higher sales price may be achieved if a listing is maintained over a period of time. For example, lower-priced listings may clear marketplace channel 210f over time, enabling higher-priced listings to sell. Consequently, in some embodiments, determination of the minimum expected price for the unit(s) may take into account a desired time interval over which the unit(s) are expected to sell. For example, engine 209 may take both current listings and historical sales data into account to determine a minimum expected price for which a unit of given item 35 has a certain likelihood (e.g., a probability percentage) of selling during a specified interval of time (e.g., a number of weeks, months, etc.).

In some embodiments, if there are no relevant current marketplace listings for given item 35 and if insufficient historical data exists to guide pricing, the expected price range for the unit(s) of given item 35 may be determined according to default values. For example, in one embodiment, disposition policies 205 may store default minimum and maximum pricing guidelines, such as percentage discounts off of a new catalog price, for items in various different conditions. Also, it is contemplated that in some embodiments, a single expected price rather than a range of prices may be determined. For example, in some embodiments only the minimum or maximum expected price may be determined, or the two may be averaged to produce a single price. In some embodiments, before default values are used to determine expected pricing for a given item 35, available historical data for related items 35 may be considered. For example, historical data for a different model or version of given item 35 (such as a different binding of a book, a different format of a videotape or DVD, etc.) or for a different item 35 in the same general product class as given item 35 may be considered.

The expected price range for the unit(s) is then optionally adjusted according to any relevant criteria (block 810). For example, in one embodiment, sellers listing items 35 within marketplace channel 210f may have corresponding ratings or rankings, such as satisfaction or reliability ratings based on customer feedback. In such an embodiment, engine 209 may be configured to take into account seller rating in determining the expected price range, e.g., by increasing a minimum or maximum expected price if competing sellers are poorly rated. Adjustments may also take into account market factors such as the popularity of given item 35 (e.g., as indicated by corresponding historical sales or shopping data, sales velocity measures, etc.), the number of listings for the given item 35, and/or the number of units of the given item 35 corresponding to the detected disposition event. For example, engine 209 may be configured to raise the expected price range for price popular or scarce items 35, or to lower it for slow-moving or glutted items 35.

In some embodiments, engine 209 may be configured to take into account data external to marketplace channel 210f, such as merchant planning and purchasing forecasts. For example, in one embodiment engine 209 may be configured to consult with forecast service 130 and/or pricing service 140 of inventory management system 50 to ascertain sales forecasts and inventory acquisition plans for new units of given item 35, and to accordingly adjust the expected price range for the units subject to disposition.

All valid channels 210 are then evaluated, taking the expected price range determined for marketplace channel 210f into account if that channel is valid (block 812). For example, disposition logic 207 may be configured to compare the expected price range corresponding to marketplace channel 210f to the expected recovery value associated with other channels 210 (e.g., return-to-vendor channel 210a, liquidation channel 210b). In one embodiment, marketplace channel 210f may be ranked above another channel 210 in a value-based ranking if some price in the expected price range associated with marketplace channel 210f exceeds the expected recovery value associated with the other channel 210. For example, if a price available from a liquidator is greater than the minimum expected price but less than the maximum expected price, marketplace channel 210f may rank higher than liquidation channel 210b.

A particular channel or channels 210 is then selected for disposition of the unit(s) of the given item 35 (block 814). In some embodiments, disposition policies 205 may factor into channel selection in a manner similar to that described above, such that the highest-ranked channel 210 by expected recovery value may not necessarily be the selected channel. In some embodiments, disposition logic 207 may be configured to take into account risk associated with expected recovery value. For example, in one embodiment, if a supplier offers a no-questions-asked full credit return policy for certain items 35, the return-to-vendor 210a channel may be selected even if the maximum expected price from marketplace channel 210f is greater than the available vendor credit. In such an instance, returning items 35 to the supplier may be the lower-risk option, as receiving the higher price from marketplace channel 210f requires that the marketplace listing precipitate an actual sale.

In some embodiments, information gained and decisions made during the evaluation and selection of a particular disposition channel 210 may have an impact on modeling decisions that may have originally generated the disposition event. For example, a disposition event may have occurred as a result of manager 110 identifying poor expected profitability for certain units of an item 35 on the basis of forecast sales and/or pricing trends. Actual evaluation of channels 210 by disposition service 190 may provide additional information that impacts original forecasts. For example, the existence of many or few listings of an item 35 on marketplace channel 210f may be relevant supply vs. demand feedback for forecast service 130 or pricing service 140. Similarly, the decision to dispose of large quantities of one item 35 via one or more of channels 210 may impact future sales projections for that item 35 or related items 35. For example, listing a large quantity of slightly damaged units of an item 35 via marketplace channel 210f may negatively impact near-term demand for new units of that item 35. Consequently, in some embodiments, disposition service 190 may be configured to provide feedback regarding disposition decisions to inventory management system 50. Correspondingly, in some embodiments inventory management system 50 may be configured to reevaluate modeling assumptions that led to a particular disposition event in light of such feedback before committing to a particular disposition strategy.

Like the inventory management services described above, in some embodiments disposition and marketplace pricing services provided by disposition service 190 may be offered by a merchant to partners, affiliates or clients. For example, in one embodiment disposition service 190 may be accessible to clients via a web services interface, either directly or via another system such as inventory management system 50. Also, it is contemplated that in some embodiments, disposition service 190 may be configured to track the status of units of items 35 disposed of through various channels 210. For example, units of some items 35 may spend a period of time in a channel such as marketplace channel 210f before their disposition is complete (e.g., a sale is concluded). In one embodiment, disposition service 190 may be configured to reevaluate and reprice units of items 35 in certain channels 210 after a period of time has elapsed since the initial disposition decision was made. Alternatively, disposition service 190 may be configured to notify a user that certain items 35 may be growing stale within a channel 210. The user may then elect to direct disposition service 190 to reevaluate disposition options for such items 35, including repricing them within their existing channel 210 or selecting a different channel 210.

Exemplary Computer System Embodiment

It is contemplated that in some embodiments, any of the methods or techniques described above may be implemented as program instructions and data capable of being stored or conveyed via a computer-accessible medium. Such methods or techniques may include, for example and without limitation, the functions of manager 110, disposition service 190, or any other element of inventory management system 50, as well as the methods illustrated in FIGS. 4, 6 and 8. Such program instructions may be executed to perform a particular computational function, such as inventory metric generation and analysis, data warehousing and virtualization, storage management, query and data set analysis, query evaluation, operating system functionality, applications, and/or any other suitable functions.

Figure 9:
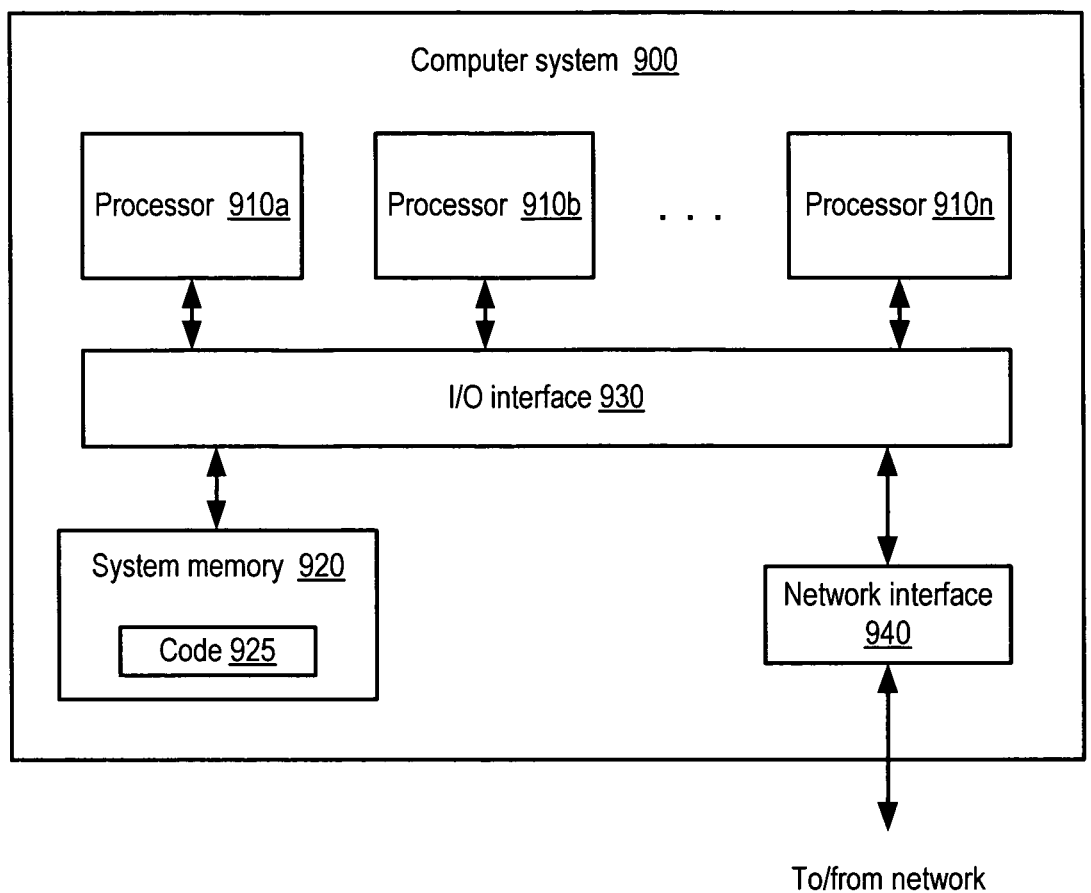
FIG. 9 is a block diagram illustrating an exemplary embodiment of a computer system.

One exemplary embodiment of a computer system including computer-accessible media is illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. In some embodiments, it is contemplated that inventory management system 50 may be implemented using by a single instance of computer system 900, while in other embodiments multiple such systems may be configured to host different portions of inventory management system 50. For example, in one embodiment some data sources or services may be implemented via instances of computer system 900 that are distinct from those instances implementing other data sources or services.

In various embodiments computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by process 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD/DVD-ROM coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   individually evaluating, by one or more computers, a respective expected profitability for each particular unit of a plurality of units of items held as inventory, wherein evaluating a respective expected profitability for each particular unit comprises:
      accessing one or more records comprising cost information for said particular unit;
      forecasting a future date of transaction corresponding to said particular unit; determining expected costs of holding said particular unit until said forecasted future date of transaction based on said cost information for said particular unit;
      determining expected revenue for said unit associated with said forecasted future date of transaction;
      determining said respective expected profitability of said particular unit as of said future date of transaction corresponding to said particular unit, wherein determining said respective expected profitability comprises comparing said determined expected costs of holding said particular unit until said forecasted future date of transaction to said determined expected revenue for said unit associated with said forecasted future date of transaction; and
      determining whether said particular item is currently profitable but is expected to be unprofitable as of said future date of transaction;
   prior to said future date of transaction, individually determining, by one or more computers, a disposition of each respective unit of said plurality of units determined to be currently profitable but expected to be unprofitable as of said future date of transaction; and
   responsive to the individually determining, redirecting said each respective unit, wherein, for said each respective unit, redirecting comprises: notifying a disposition service configured to coordinate liquidation of said each respective unit, updating a record to reflect removal of said each respective unit from inventory, or presenting disposition options for a plurality of conditions of said each respective unit, wherein selection of an option determines how to proceed with said each respective unit.

2. The method as recited in claim 1, wherein determining said respective expected profitability of a particular one of said plurality of units as of a forecasted future date of transaction corresponding to said particular unit comprises:
   forecasting an estimated revenue corresponding to said particular unit as of said future date of transaction corresponding to said particular unit;
   estimating accrued costs of holding said particular unit until said future date of transaction corresponding to said particular unit; and
   comparing a total cost of said particular unit against said estimated revenue, wherein said total cost includes said accrued costs of holding said particular unit until said future date of transaction corresponding to said particular unit.

3. The method as recited in claim 2, wherein individually determining said disposition of a given one of said plurality of units comprises:
   if said estimated revenue exceeds said total cost of said given unit by less than a threshold value, determining to dispose of one or more units corresponding to a same item as said given unit prior to said future date of transaction corresponding to said given unit.

4. The method as recited in claim 3, wherein determining a disposition of said one or more units prior to said future date of transaction corresponding to said given unit comprises determining to liquidate at least some of said plurality of units.

5. The method as recited in claim 3, wherein determining a disposition of said one or more units prior to said future date of transaction corresponding to said given unit comprises determining to discount at least some of said plurality units.

6. The method as recited in claim 3, wherein determining a disposition of said one or more units prior to said future date of transaction corresponding to said given unit comprises determining to offer a sales promotion associated with at least some of said plurality of units.

7. The method as recited in claim 2, wherein accrued costs of holding said particular unit comprise a cost of storing said particular unit and an economic cost associated with acquisition of said particular unit.

8. The method as recited in claim 1, further comprising:
subsequent to individually determining said disposition of a given one of said plurality of units, reevaluating said expected profitability of said given unit dependent upon said disposition.

9. The method as recited in claim 1, wherein at least a subset of said plurality of units comprises a plurality of identical units of a same item.

10. The method as recited in claim 1, wherein for a given one of said plurality of units, said disposition comprises:
instructing that one or more of said units corresponding to a same item as said given unit be removed from inventory in response to determining that said respective expected profitability of said given unit is less than a threshold value; and
instructing that one or more of said units corresponding to a same item as said given unit be retained as inventory in response to determining that said respective expected profitability of said given unit is at least greater than said threshold value.

11. The method as recited in claim 1, wherein evaluating said respective expected profitability of said particular unit occurs before said particular item is removed from inventory either for disposition or for delivery to a customer.

12. A non-transitory computer-accessible storage medium storing program instructions, wherein the program instructions are executable by a computer system to implement:
individually evaluating a respective expected profitability for each particular unit of a plurality of units of items held as inventory, wherein evaluating a respective expected profitability for each particular unit comprises:
accessing one or more records comprising cost information for said particular unit;
forecasting a future date of transaction corresponding to said particular unit;
determining expected costs of holding said particular unit until said forecasted future date of transaction based on said cost information for said particular unit;
determining expected revenue for said unit associated with said forecasted future date of transaction;
determining said respective expected profitability of said particular unit as of said future date of transaction corresponding to said particular unit, wherein determining said respective expected profitability comprises comparing said determined expected costs of holding said particular unit until said forecasted future date of transaction to said determined expected revenue for said unit associated with said forecasted future date of transaction; and
determining whether said particular item is currently profitable but is expected to be unprofitable as of said future date of transaction;
prior to said future date of transaction, individually determining a disposition of each respective unit of said plurality of units determined to be currently profitable but expected to be unprofitable as of said future date of transaction; and
responsive to the individually determining, redirecting said each respective unit, wherein, for said each respective unit, redirecting comprises: notifying a disposition service configured to coordinate liquidation of said each respective unit, updating a record to reflect removal of said each respective unit from inventory, or presenting disposition options for a plurality of conditions of said each respective unit, wherein selection of an option determines how to proceed with said each respective unit.

13. The non-transitory computer-accessible storage medium as recited in claim 12, wherein determining said respective expected profitability of a particular one of said plurality of units as of a forecasted future date of transaction corresponding to said particular unit comprises:
forecasting an estimated revenue corresponding to said particular unit as of said future date of transaction corresponding to said particular unit;
estimating accrued costs of holding said particular unit until said future date of transaction corresponding to said particular unit; and
comparing a total cost of said particular unit against said estimated revenue, wherein said total cost includes said accrued costs of holding said particular unit until said future date of transaction corresponding to said particular unit.

14. The non-transitory computer-accessible storage medium as recited in claim 13, wherein individually determining said disposition of a given one of said plurality of units comprises:
if said estimated revenue exceeds said total cost of said given unit by less than a threshold value, determining to dispose of one or more units corresponding to a same item as said given unit prior to said future date of transaction corresponding to said given unit.

15. The non-transitory computer-accessible storage medium as recited in claim 14, wherein determining a disposition of said one or more units prior to said future date of transaction corresponding to said given unit comprises determining to liquidate at least some of said plurality of units.

16. The non-transitory computer-accessible storage medium as recited in claim 14, wherein determining a disposition of said one or more units prior to said future date of transaction corresponding to said given unit comprises determining to discount at least some of said plurality of units.

17. The non-transitory computer-accessible storage medium as recited in claim 14, wherein determining a disposition of said one or more units prior to said future date of transaction corresponding to said given unit comprises determining to offer a sales promotion associated with at least some of said plurality of units.

18. The non-transitory computer-accessible storage medium as recited in claim 13, wherein accrued costs of holding said particular unit comprise a cost of storing said particular unit and an economic cost associated with acquisition of said particular unit.

19. The non-transitory computer-accessible storage medium as recited in claim 12, wherein the program instructions are further executable by a computer system to implement:
subsequent to individually determining said disposition of a given one of said plurality of units, reevaluating said expected profitability of said given unit dependent upon said disposition.

20. The non-transitory computer-accessible storage medium as recited in claim 12, wherein at least a subset of said plurality of units comprises a plurality of identical units of a same item.

21. The non-transitory computer-accessible storage medium as recited in claim 12, wherein for a given one of said plurality of units, said disposition comprises:
instructing that one or more of said units corresponding to a same item as said given unit be removed from inventory in response to determining that said respective expected profitability of said particular unit is less than a threshold value; and instructing that one or more of said units corresponding to a same item as said given unit be retained as inventory in response to determining that said respective expected profitability of said particular unit is at least greater than said threshold value.

22. The non-transitory computer-accessible storage medium as recited in claim 12, wherein evaluating said respective expected profitability of said particular unit occurs before said particular item is removed from inventory either for disposition or for delivery to a customer.

\* \* \* \* \*